United States Patent
Zhang

(10) Patent No.: US 7,291,186 B2
(45) Date of Patent: Nov. 6, 2007

(54) SOLID POROUS ZINC ELECTRODES AND METHODS OF MAKING SAME

(75) Inventor: Xiaoge Gregory Zhang, Toronto (CA)

(73) Assignee: Teck Cominco Metals Ltd., Vancouver, BC (CA)

( * ) Notice: Subject to any disclaimer, the term of this patent is extended or adjusted under 35 U.S.C. 154(b) by 481 days.

(21) Appl. No.: 10/976,861

(22) Filed: Nov. 1, 2004

(65) Prior Publication Data

US 2006/0093909 A1    May 4, 2006

(51) Int. Cl.
*H01M 4/82* (2006.01)
*H01M 4/42* (2006.01)
*H01M 4/72* (2006.01)

(52) U.S. Cl. .................. 29/623.1; 429/229; 429/233
(58) Field of Classification Search ............... 429/229, 429/211, 233; 29/623.1
See application file for complete search history.

(56) References Cited

U.S. PATENT DOCUMENTS

| | | | |
|---|---|---|---|
| 3,625,772 A * | 12/1971 | Himy | 429/139 |
| 3,853,625 A | 12/1974 | Louzos | |
| 3,904,344 A | 9/1975 | Maringer et al. | |
| 4,037,033 A * | 7/1977 | Takamura et al. | 429/206 |
| 4,154,284 A | 5/1979 | Maringer | |
| 4,226,920 A | 10/1980 | Armstrong | |
| 4,242,069 A | 12/1980 | Maringer | |
| 4,290,993 A | 9/1981 | Maringer | |
| 4,326,579 A | 4/1982 | Pond, Sr. et al. | |
| 4,385,013 A | 5/1983 | Couling et al. | |
| 4,397,623 A | 8/1983 | Porter et al. | |
| 4,942,918 A | 7/1990 | Maringer | |
| 5,122,375 A * | 6/1992 | Sklarchuck et al. | 429/229 |
| 5,584,109 A | 12/1996 | DiGiovanni et al. | |
| 5,599,637 A | 2/1997 | Pecherer et al. | |

(Continued)

FOREIGN PATENT DOCUMENTS

EP    1 190 463 B1    11/2003

(Continued)

OTHER PUBLICATIONS

Compare Tekcast Spin-Casting to Other Processes, http://www.tekcast.com/compare.htm, Tekcast Industries, Inc., pp. 1 to 3.

(Continued)

*Primary Examiner*—Patrick Joseph Ryan
*Assistant Examiner*—Thomas Parsons
(74) *Attorney, Agent, or Firm*—Oyen Wiggs Green & Mutala LLP

(57) ABSTRACT

A solid porous zinc electrode for use in alkaline-zinc batteries, zinc-air batteries and fuel cells is provided which comprises specific zinc filaments, fibers, threads or strands compressed into a physically-stable wooly mass to form the electrode with a controlled geometrical shape and porosity distribution. Differential densification incorporates ribs, borders, grids or tabs for good structural integrity, mechanical strength, electrochemical behavior, and electrical conductivity. Pressing in a mold or rolling of a compressed sheet can also provide an anode with a large anode/cathode interface area and a complex geometry. The filaments of controlled dimension and composition are preferably made by spin forming from molten zinc alloys. Such anodes are not susceptible to breakage, have a long storage life and can be used in high rate discharge applications.

47 Claims, 15 Drawing Sheets

U.S. PATENT DOCUMENTS

| | | |
|---|---|---|
| 5,667,749 A | 9/1997 | Lau et al. |
| 6,022,639 A | 2/2000 | Urry |
| 6,221,527 B1 | 4/2001 | Tang |
| 6,265,105 B1 * | 7/2001 | Tokuda et al. .............. 429/206 |
| 6,284,410 B1 | 9/2001 | Durkot et al. |
| 6,521,378 B2 | 2/2003 | Durkot et al. |
| 6,673,494 B2 | 1/2004 | West et al. |
| 2002/0142202 A1 | 10/2002 | Li et al. |
| 2003/0170543 A1 | 9/2003 | Headrick et al. |
| 2003/0203281 A1 | 10/2003 | Melzer et al. |
| 2003/0211394 A1 | 11/2003 | Tang |
| 2004/0023110 A1 | 2/2004 | Parent et al. |
| 2004/0031143 A1 | 2/2004 | Morris et al. |
| 2004/0115532 A1 | 6/2004 | Malservisi et al. |

FOREIGN PATENT DOCUMENTS

| | | |
|---|---|---|
| WO | WO 01/24292 A1 | 4/2001 |
| WO | WO 01/56098 A2 | 8/2001 |
| WO | WO 2004/027894 A2 | 4/2004 |

OTHER PUBLICATIONS

With Tekcast's Spin-Cast System Precision Parts Are Manufactured With Major Savings In Time & Labor . . . , http://www.tekcast.com/why.htm, Tekcast Industries, Inc., pp. 1 to 3.

Zinc Alloys, http://www.tekcast.com/casting1.htm, Tekcast Industries, Inc., pp. 1 to 3.

* cited by examiner (a) 180° bending      (b) 90° bending

SOLID POROUS ZINC ELECTRODES AND METHODS OF MAKING SAME

FIELD OF INVENTION

This invention relates to the field of electrochemical devices such as batteries, fuel cells, energy storage materials, materials and electrode manufacturing processes and other applications for which the zinc is an anode material and the performance of zinc anode is an important criteria. More particularly, this invention pertains to a solid porous zinc electrode for alkaline-zinc and zinc-air batteries and fuel cells formed of zinc fibers, filaments, threads or strands, compressed into physically stable masses having controlled geometrical shapes and porosity distribution.

BACKGROUND OF THE INVENTION

Manufacturers of zinc batteries and fuel cells are constantly seeking improvement in the performance of these electrochemical energy devices. There is an ever-increasing demand for batteries that can provide higher power without unacceptable sacrifices in desirable battery performance characteristics, such as long discharge life (high capacity), long storage life, resistance to electrolyte leakage and ease of manufacturing. There has been continuous effort in the industry to develop better zinc particulate material for alkaline-zinc batteries, zinc-air batteries and fuel cells. Attempts have been made to improve the particle size distribution, to change alloy composition, or to use different forms of particulates such as zinc ribbons, or flakes, or wires. Attempts have also been made to increase the interface area between the anode and the cathode.

Zinc materials for alkaline battery anodes have been constructed in three basic dimensional forms, namely zero-dimensional (where the x, y, z dimensions are about the same) such as with spheres, cubes, or one-dimensional (where one of the three dimensions is significantly larger than the other two dimensions) such as fibers and wires, and two-dimensional (where one dimension is significantly smaller than the other two dimensions) such as sheets. Zinc powder, as zero-dimensional material (produced by atomization or electroplating), zinc fibers as one-dimensional material (including needles, wools, wires and filaments which can be produced by different methods including extruding, milling, casting, and electroplating), and zinc sheets as two-dimensional material (including solid discs, flakes, ribbons and sheets, and perforated and expanded sheets which can be produced with different methods including rolling and casting) have been developed in the industry. In order to obtain the distributions of solid and porous space required for zinc anodes to perform satisfactorily in batteries or fuel cells, different methods can be utilized to process the materials of the three different dimensional types.

From a system perspective, the dimension, the shape of the anode and cathode, the anode/cathode interface area, the separator material, the amount and composition of electrolyte, the material and design of current collector, and the properties of electrodes are all highly important in the performance of batteries and fuel cells. These need to be properly designed. With respect to the properties of electrodes, important parameters include specific surface area (defined as the total physical surface area per unit of weight, $m^2/g$), effective surface area (the amount of surface area that is electrochemically active), surface activity, porosity, electrical conductivity, and mechanical stability. Many of these characteristics are determined by the distributions of solid and porous space in the given volume of the space that is determined by the design of the battery and the characteristics of the materials.

Different forms of materials have different value sets for specific surface area, effective surface area, surface activity, porosity, electrical conductivity, and mechanical stability. A zinc powder that performs well in a battery of given design is the result of the combined effect of these parameters. Control of only one or two of these parameters alone will not result in an anode that can perform well in batteries. For example, for the same specific surface area, powders of different particle distribution can have different discharging performance as is disclosed in U.S. Pat. No. 6,284,410 A1. A powder that performs well in one battery design may not perform well in another battery design. For this reason, there has been continuous development of zinc powders for use in different alkaline and zinc-air batteries.

Control of the effective surface area of electrode materials is critically important in battery design. In general, the smaller the particle size, the larger the surface area. A large surface area will result in high activity and thus high battery power. However, a zinc anode with a very large surface area has a downside because it can cause excessive gassing due to the corrosion of the zinc in the electrolyte. The zinc powders used in making alkaline batteries in the market place have a specific range of surface area, typically between 0.01 and 0.1 $m^2/g$. There has been a trend to use finer zinc particulates, i.e. large surface area, in order to increase the power of alkaline batteries as demonstrated in a recent U.S. Pat. No. 6,521,378.

Control of porosity (the space between zinc particulates that is occupied by the electrolyte) of the zinc anode is another important consideration. For a given battery design, there is a certain range of preferred porosity, and anodes made of a specific form of zinc particulate material perform the best in these conditions. In alkaline batteries using atomized zinc powder, the lowest volume percent in the zinc anodes is not less than 28% of the zinc anode paste (including zinc powder, KOH, additives and gelling agents) in order to match the positive electrode's rate of electrochemical output and provide sufficient particle-to-particle and particle-to-current collector contact to maintain the zinc anode's electrical conductance (see, for example, U.S. Pat. No. 6,221,527). Below this amount, voltage instability occurs and battery performance becomes sensitive to shock and vibration. On the other hand, if the zinc powder volume in the anode is too high, e.g. higher than 50%, there is not sufficient space between the particles for storing electrolyte and the dissolution product which is a mix of zinc oxide, hydroxide and some elemental zinc.

The zinc powder used in alkaline battery applications before being mixed with electrolyte typically has a density of 3 to 3.5 $g/cm^3$, which is about 42% to 50% zinc volume and 50% to 58% in porosity. To reach the porosity required for alkaline cells to perform well, which is typically about 70%, manufacturers typically use a gelling agent to make the mix of zinc powder and electrolyte such that the zinc particles are not densely packed but are somewhat suspended in the electrolyte gel. However, for a given powder (certain shapes of particles and particle size distributions) there is only a narrow range that the particles can be suspended without losing electrical contact between the particles.

Surface activity determines the rate of discharge under a given performance condition as well as the gassing rate under an idle condition. The surface activity of zinc is related to a set of electrochemical properties, which are well documented by Zhang (Corrosion and Electrochemistry of Zinc, Plenum Publishers, 1996) the contents of which are incorporated herein by reference. It is desirable for batteries designed for high drain applications to have materials that have a surface activity that allows a high rate of discharge but have a low rate of gassing. Commercially available zinc powders used in alkaline batteries and fuel cells are typically alloyed to various compositions in order to obtain a desirable surface activity. In addition to alloying, surface activity may also be controlled by adding corrosion inhibitors in the electrolyte, surface treatment of zinc particulates, and the like.

Physical stability of the anode is another consideration in battery design. Atomized powder, as a physical body, generally behaves like a liquid, and is not in a self-contained form. It tends to flow under the effect of gravity. The use of gel serves to help immobilize the particles relative to each other and to the current collector and thus provides a certain mechanical stability to the anode, which is essential for reliable battery performance.

There is a combined effect of the above mentioned parameters on zinc anodes made from atomized powder in order to have desirable performance of the batteries in specific applications. For anodes made from atomized powder, gelling is required to provide the porosity required for desirable performance of the batteries. However, since gelling causes reduction in particle connectivity and thus anode conductivity, the amount of gelling and thus the extent of porosity control is limited. Furthermore, although gelling provides certain immobilization of zinc powder particles, the gelled anode is still a paste and does not have the same mechanical integrity as a solid. Thus, battery anodes made from atomized powder do not achieve optimal utilization of the energy that is latent in the zinc anode because they do not allow for independent control over porosity and surface area while maintaining good electrical conductivity among the zinc particles.

Zinc powder, as a zero-dimensional material, is typically produced by an atomizing process and has been the dominant material for making anodes for alkaline and zinc-air batteries that are available in the market place. Zinc powder requires gelling to make anode that can perform in battery. However, a gelled anode has lower electrical conductivity compared to non-gelled material and has limited mechanical integrity and a limited range of control over porosity without losing electrical contact between the particles. Thus, anodes made of atomized powder do not allow the optimal utilization of the latent energy in the zinc metal. Much prior art can be found in the patent literature and new patents are being granted on a continuous basis. For example, U.S. Pat. No. 6,521,378 B2 discloses the making of zinc anodes using powders that have a multi-modal distribution of zinc-based particles. WO 01/56098 A2 discloses the making of zinc particle agglomerates using low melting metal binder to make agglomerates of powder particles. U.S. Pat. No. 6,284,410 and U.S. Publication No. 2003/0203281 A1 show related control of particle distribution of atomized powder to improve performance under high discharge rate.

Zinc powder produced through electroplating in KOH electrolyte has been used for making anodes in battery and fuel cell applications. The powder, usually in the form of dendrites, generally has a very high specific surface area. Alkaline Zn—Ag batteries using electroplated powder have been used in many military applications such as power sources for launching missiles and rockets [Zinc-Silver Oxide Batteries, Ed. By Flecher & Lander, 1971, John Wiley & Sons]. More recently, electroplated zinc dendritic material has found application in power sources for vehicles. U.S. Pat. Nos. 5,599,637 and 5,206,096, for example, teaches the art of using electroplated zinc dendrite material to make anodes for mechanically refuelable zinc-air fuel cells to power electric buses. A similar type of material is used to make anodes for mechanically refuelable zinc-air fuel cells for power electric bicycles (see web page of Powerzinc Inc). In mechanically refuelable batteries and fuel cells, the discharged zinc anodes are physically removed from the cells and replaced by fresh anodes.

However, the high surface area also means a high corrosion rate of the anode in KOH solution and thus the anode is not suitable for long-term storage. Also, the anode is made by pressing dendritic zinc into a plate which has a limited strength and tends to break under mechanical stress, though it is in solid form. Furthermore, the use of electroplating to produce the anode also has a limitation in economical operation of mechanically refuelable zinc-air fuel cells.

One-dimensional forms of materials such as fibers, needles, wools or ribbons for making battery anodes have been documented as early as 1974 [Kordesch, Batteries, Volume 1 Manganese Dioxide]. The use of fibrous materials for making anodes allows the independent control of surface area and porosity over a wide range while maintaining electrical connectivity of all zinc fibers with no need for a gelling agent. The advantage of the solid electrode made of fibrous materials is that individual fibers are physically connected with a number of other fibers and are linked together as a solid form. The density and porosity is then controlled by the degree of confinement of the fibrous materials under a mechanical pressing.

There have been a number of prior disclosures about using zinc in a one-dimensional form of fibers, needles, wools or ribbons as battery anodes. For example, U.S. Pat. No. 3,853,625 discloses the use of zinc filaments produced by electroplating for making battery anodes. U.S. Pat. No. 5,584,109 discloses an electrode made with caddied and extruded metallic fibers. U.S. Pat. No. 6,221,527 B1 discloses zinc ribbon for use as battery anodes. U.S. Publication No. 2002/0142202 A1 discloses an electrode for an electrochemical cell. The electrode comprises a plurality of fibers comprised of an electrically conductive material configured to conduct electrons to an electrolyte of the electrochemical cell. U.S. Publication No. 2003/0170543 A1 discloses the use of fibers produced by mechanical milling for making zinc battery anodes. While the disclosures in these patents and publications demonstrate one-dimensional forms, they neither demonstrate the utility of the anode made of these materials in actual batteries nor do they show materials, conditions and processing procedures that are practically usable.

Some prior art also discloses the use of two-dimensional forms (sheets, flakes etc.) of zinc materials for making anodes. For example, U.S. Pat. No. 4,226,920 teaches the making of anode by rolling expanded and woven metal zinc mesh to the final cylindrical form and size. The discharging performance of such anodes, although showing benefits compared to the conventional cells at the time, is nonetheless greatly inferior to the performance of current commercial batteries. WO 01/24292 A1 discloses rounded zinc flakes coated with a gelling agent for making battery anodes. The disclosure is not commercially practical because the processing steps for making such anodes are complex and thus costly. U.S. Pat. No. 6,673,494 discloses the use of expanded mesh to make anodes but provides no indication whether such anodes can provide improved performance. U.S. Pat. No. 6,022,639 discloses the use of zinc flakes for making high performance batteries. Nonetheless, the use of gel to control porosity and mechanical integrity of the anode is still required.

Flake and sheet materials have a shortcoming related to effective surface area, which is the surface area available for electrochemical reaction. Electrochemical reactions become stagnated whenever the path for current flow is narrowed as is the case in the gaps between overlapped sheets of metals. Because there is a tendency for individual sheets and flakes to overlap with each other, a significant percentage of surface area becomes unavailable for reaction with these materials. Thus, the effective surface area of such material is generally much smaller than the specific surface area of the flake or sheet material.

SUMMARY OF INVENTION

This invention relates to a solid porous zinc electrode for use in alkaline-zinc batteries, zinc-air batteries or fuel cells, comprising a group of fibers, filaments, threads or stands compressed into a mass with controlled geometric shape and density distribution. In this disclosure, the group of fibers, filaments, threads or strands may be called "wooly material" or wooly zinc material. In some embodiments, the electrode may have a uniform density distribution over its area. The density may be in the range of +0.5 $g/cm^3$ to 6.3 $g/cm^3$. Preferably, the density may be in the range of 1 $g/cm^3$ to 3 $g/cm^3$.

In the electrode, there may be areas where the fibers, filaments, threads or strands are more densely compressed than in other areas where the fibers, filaments, threads or strands are less densely compressed.

In the electrode, the more densely compressed areas may have a density in the range of 2.5 $g/cm^3$ to 7.13 $g/cm^3$ and the less densely compressed areas may have a density in the range of 0.5 $g/cm^3$ to 6.3 $g/cm^3$. The more densely compressed areas may have a density in the range of 2.5 $g/cm^3$ to 7.13 $g/cm^3$ and the less densely compressed areas may have a density in the range of +0.5 $g/cm^3$ to 3 $g/cm^3$. Preferably, the more densely compressed areas may have a density in the range of 3.5 $g/cm^3$ to 6.3 $g/cm^3$ and the less densely compressed areas may have a density in the range of 1 $g/cm^3$ to 3 $g/cm^3$.

In the electrode, the areas where the fibers, filaments, threads or strands are densely compressed may form a grid-like network and the less densely compressed fibers, filaments, threads or strands may occupy the spaces between the densely compressed grid-like network.

In the electrode, a current collector may be made of electrically conducting material such as zinc, copper, tin, silver, nickel, titanium, magnesium or alloys of these materials. The electrically conducting material may be plated or clad with silver, tin or copper. The electrically conducting material may be made of the same fibers, filaments, threads or strands as the electrode and can be a natural or continuous extension of the grid-like network. The current collector may be embedded in the group of fibers, filaments, threads or strands.

In the electrode, the electrode may have a dense border or edge plate around its periphery. The electrode with a grid-like network may be in the form of a plate or a cylinder.

In the electrode the zinc fibers, filaments, threads or strands may be compressed into a mold to form a solid porous anode. The mold may have a hollow interior with specified cross-sectional geometry and the zinc fibers, filaments, threads or strands may be formed by the interior into a solid porous of specified geometric shape. The hollow interior of the mold may be in the shape of a cylinder and the zinc fibers, filaments, threads or strands may be formed by the hollow cylindrical interior into a porous solid cylinder. The zinc fibers, filaments, threads or strands may be compressed into a sheet which may then be rolled into a cylinder of a desired diameter.

In the electrode, the fibers, filaments, threads, or strands may be produced by spin forming, mechanical machining, extrusion, atomizing, casting and other suitable methods. The surfaces of the zinc fibers, filaments, threads or strands may be uneven or not smooth. The peripheral cross-sectional shape of the zinc, fibers, filaments, threads or strands may be in the general shape of a half-round.

In the electrode, the electrode may include a removable current connector. The current collector may be formed of zinc. The current collector may be plated.

In the solid porous zinc electrode used in alkaline-zinc batteries, zinc-air batteries, or fuel cells the group of zinc fibers, filaments, threads or strands may be compressed into a physically stable mass having a controlled geometric shape and porosity distribution. In the electrode, the fibers, filaments, threads or strands may be pressed onto a separator material.

In the electrode, the nominal diameter of the fibers, filaments, threads or strands may be between 5 and 1000 μm and the length of the fibers, filaments, threads or strands may be at least 10 times the diameter. The zinc fibers, filaments, threads or strands may be alloyed with one or more metals selected from the group consisting of Bi, In, Ca, Al, Mg, Ga, Sn, Pb and Cd. The zinc used in forming the zinc fibers, filaments, threads or strands may be alloyed with 100 to 1000 ppm Bi, or 100 to 1000 ppm In, or 100 to 1000 ppm Bi and 100 to 1000 ppm In.

The zinc fibers, filaments, threads or strands may be compressed into non-woven zinc wool with pores and spaces between the fibers, filaments, threads or strands. In the electrode, the zinc wool may be pressed together with a sheet of backing material. The backing material may be selected from the group consisting of paper, cloth, matting and mesh.

The electrode may have a grid-like network of denser areas in the form of a plate. Alternatively, the electrode may be in the form of a cylinder which may be incorporated in an alkaline battery or air-zinc battery. The zinc fiber, filaments, threads or strands may be collected as a non-woven zinc wool with spaces between the fibers.

The zinc fibers, filaments, threads or strands may be compressed into a mold to form a solid porous anode. The interior of the mold may have a specified cross-sectional shape and the zinc fibers, filaments, threads or strands are compressed into the interior of the mold to form a solid porous anode having a shape congruent with the shape of the mold interior.

The invention also relates to a method of forming a solid porous zinc electrode comprising a group of zinc fibers, filaments, threads or strands having a nominal diameter between 5 and 1,000 μm and a length of at least 10 times the nominal diameter, which comprises forming the zinc fibers, filaments, threads or strands by utilizing an apparatus which converts zinc into zinc fibers, filaments, threads or strands, which are removed from the apparatus and collected in an area to form a pile of fibers, filaments, threads or strands, and compressing, the fibers, filaments, threads, or strands into a mass having a controlled geometric shape and density distribution. The apparatus may include spin forming using a molten zinc bath and a rotating knife.

In the method the zinc fibers, filaments, threads or strands may be compressed into a porous mass, which is more densely compressed in some areas than in other areas. Alternatively, the porous mass may be compressed into a porous sheet having a uniform density. The compressed sheet may be affixed to a backing material. The porous sheet and the backing material may be joined with a separator material, a cathode and a protective mesh and then rolled into an anode-cathode assembly for use in a cylindrical form of electrochemical device. The electrochemical device may be an alkaline battery.

In the method the zinc fibers, filaments, threads or strands may be compressed into a porous mass, which is more densely compressed in some areas than in other areas. Alternatively, the porous mass may be compressed into a porous sheet having a uniform density. The compressed sheet may be affixed to a backing material. The porous sheet and the backing material may be joined with a separator material, a cathode and a protective mesh and then rolled into an anode-cathode assembly for use in a calendrical form of electrochemical device. The electrochemical device may be an alkaline battery.

In the method, the notched the wheel may have a tapered edge with an angle less than 30 degrees and a tip width between 20 and 200 μm. An air jet can be used to dislodge the fibers, filaments, thread or strands and the nozzle of the air jet may be located above the wheel to dislodge the fibers, filaments, threads, or strands from the edge of the wheel as it spins out of the molten bath.

DRAWINGS

In drawings which illustrate specific embodiments of the invention, but which should not be construed as restricting the spirit or scope of the invention in any way.

Figure 21:
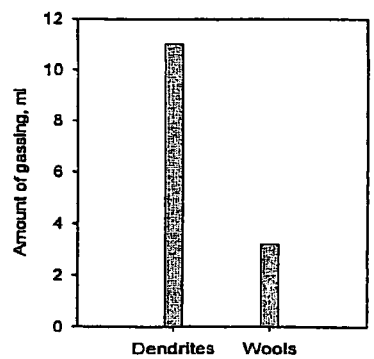

FIG. 21 graphically illustrates the comparative results of a gassing test for wooly zinc material and electroplated zinc powder. Three grams of each material were placed in 35 ml 35% KOH for 24 hours and the amount of hydrogen gas resulting from the corrosion of zinc in the electrolyte was measured.

Figure 22:
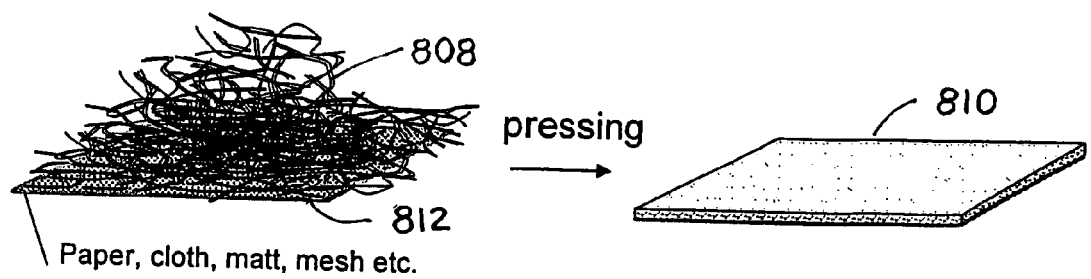

FIG. 22 depicts a schematic illustration of the making of a solid porous zinc sheet with a thin sheet of backing material.

Figure 23:
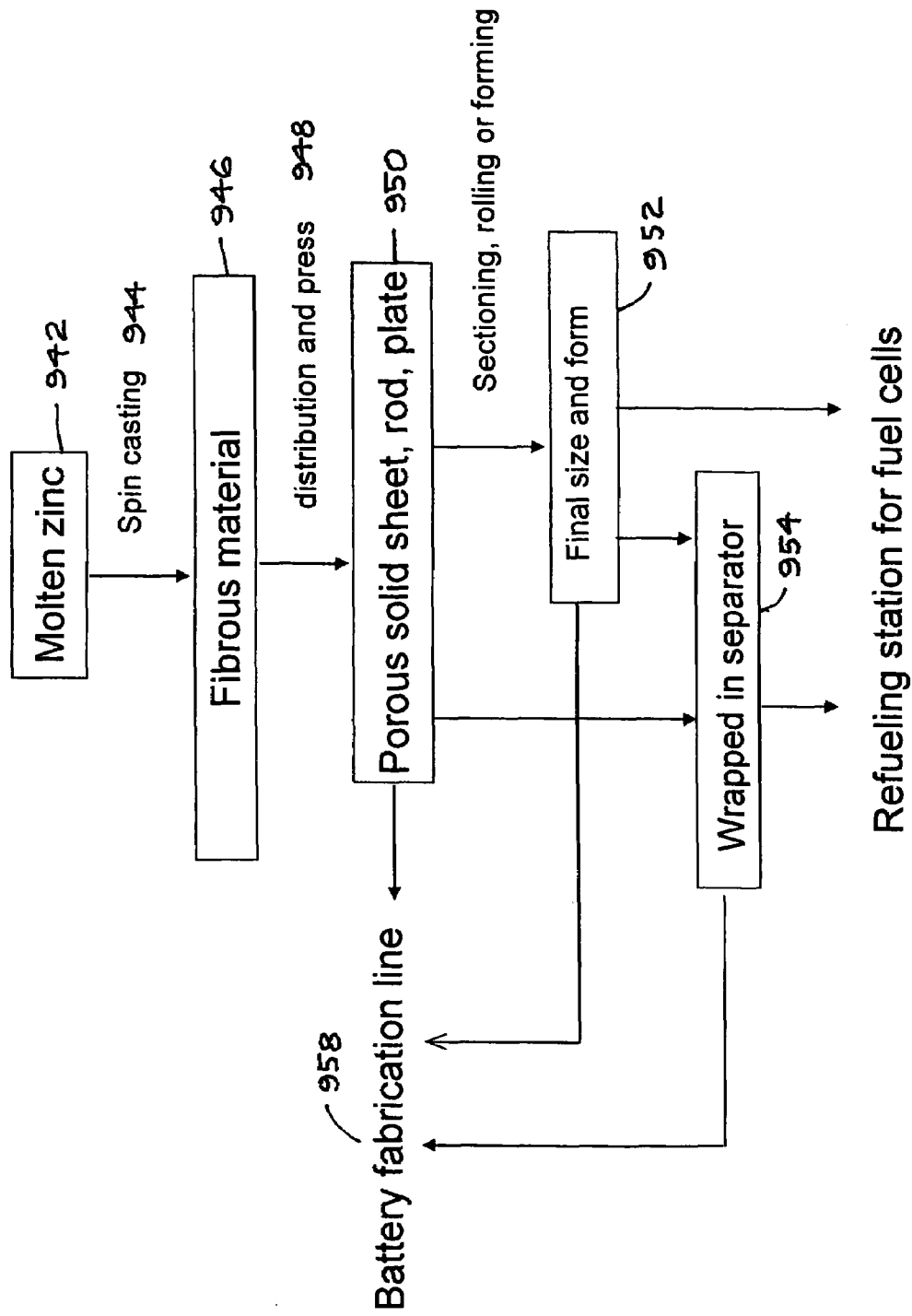

FIG. 23 depicts a schematic diagram of the steps and options for fabricating solid porous electrode with metallic wools.

DETAILED DESCRIPTION OF SPECIFIC EMBODIMENTS OF INVENTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention is directed to providing a novel construction of a solid porous zinc anode which has high performance for zinc batteries and fuel cells, particularly for alkaline batteries, zinc-air batteries and mechanically refuelable fuel cells. Among other things, anodes constructed according to the invention provide high power, good mechanical stability and reduced battery manufacturing complexity when used in primary alkaline-zinc batteries and zinc-air batteries. Anodes constructed according to the invention provide a combination of high capacity, high power, good mechanical stability, longer storage life and a more economical mode of operation for mechanically refuelable zinc batteries and fuel cells.

In one embodiment, this invention relates to solid porous electrodes constructed of zinc fibers, filaments, threads or strands that have good electrical conductivity, mechanical stability, controlled distributions of solid and porous space, uniform density in some cases, and dense and less dense areas in other cases, and effective surface area. The solid porous zinc anodes according to the invention can be used for alkaline batteries, zinc-air batteries and fuel cells with desirable performance.

In a broad aspect, this invention relates to a solid porous zinc electrode for use in alkaline-zinc batteries, zinc-air batteries or fuel cells, comprising a group of fibers, filaments, threads or strands compressed into solid form with controlled geometric shape and porosity distribution. The group of fibers, filaments, threads or strands may in some cases be called "wooly material" or wooly zinc material, or variations thereof.

Anodes according to the invention used in alkaline-zinc batteries can provide improved performance in high rate discharge capacity. The wooly zinc anodes remove the need to use a gelling agent to make the anode. Since gelling agents are required for atomized zinc powder, elimination of the gelling agent reduces the cost of materials and for manufacturing process. Furthermore, anodes formed of zinc fibers, filaments, threads or strands according to the invention enable more complex geometrical shapes with large anode/cathode interface areas to be constructed.

The use of such zinc anodes in mechanically refuelable zinc-air fuel cells for mobile power applications provides mechanical integrity of the anode and minimizes losing capacity during storage due to corrosion. Such anodes also allow simpler business operation models to be used in manufacturing batteries and using batteries. Unlike anodes made of electroplated dendritic material which can easily break due to mechanical stress from vibration or bending, anodes made from fibrous zinc material according to the invention can be bent without breaking. Also, unlike anodes made from electroplate slurry, in which the zinc slowly corrodes and can only be stored for a limited length of time, the solid porous zinc anode according to the invention can be stored in an electrolyte-free condition for an indefinite length of time without losing any noticeable capacity. The electrolyte can be added prior to the anode being put into service. This removes the need to build electroplating plants to produce zinc slurry (a mix of zinc dendrites, KOH and water) close to the geographic areas where the anodes are used. The use of anodes according to the invention can thus simplify business operation models and reduce the overall cost of business operations.

One preferred embodiment of the invention is to construct anodes for alkaline-zinc batteries and mechanically refuelable zinc-air batteries or fuel cells which have a grid and/or a tab (as the current collector) compressed to a higher density than the remainder of the anode area. Thus, an anode made of wooly zinc material according to the invention with a dense grid provides better mechanical strength and electrical conductivity of the anode. The continuity between the grid and current collector provides improved overall electrical conductivity of the anode. The use of zinc as the current collector has the additional benefit of avoiding the galvanic corrosion that occurs between dissimilar metal contacts. It also removes the need to separate the current collector after discharging of the anode for recycling.

An important feature of the invention is the development of an anode that incorporates the combined effect of solid form, distribution of solid and porous space, fiber density and physical dimension of the wooly material (comprised of fibers, filaments, threads or strands) and chemical composition of zinc or zinc alloy used in making the fibers, filaments, threads or strands. The main novel elements include: 1) an anode which has a unique set of structural and chemical characteristics that provides a stable physical form, high discharging capacity and high power density; 2) an anode which is made from wooly materials comprised of fibers, filaments, threads or strands spin formed from molten zinc with controlled physical and chemical characteristics; and, 3) a method of constructing such an anode so that it can be used in batteries and fuel cells.

Figure 1:
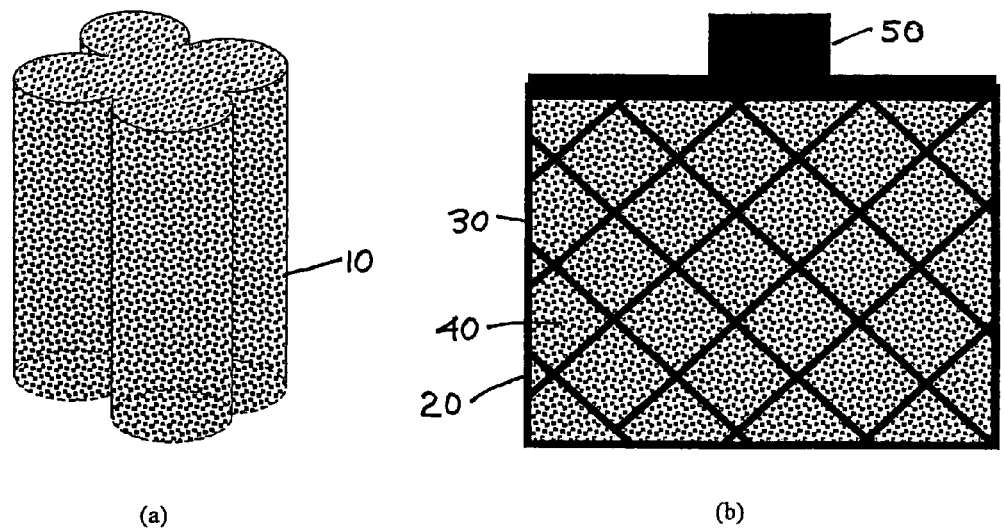
FIGS. 1a and 1b illustrate two exemplary forms of porous solid zinc electrodes constructed according to the invention.

Referring to the drawings, FIGS. 1a and 1b illustrate two exemplary forms of solid porous zinc electrodes that can be constructed according to the invention. FIG. 1(a) illustrates a perspective view of an elongated four round-sided non-cylindrical anode 10. FIG. 1(b) illustrates a front view of a planar zinc anode 20 with a grid-like pattern of dense areas 30 and less dense areas 40 between the grids. A current collector 50 is located at the top and is also pressed with the same wooly material as the body of the plate and is a natural part of the body of the anode 20. It is to be understood that the two forms of anodes illustrated in FIGS. 1(a) and 1(b) are exemplary rather than limiting and are intended to illustrate the versatility of the invention. All conceivable forms of anodes that adopt the basic principles of the invention and fulfill the objectives of the invention fall within the scope of the invention.

Figure 2:
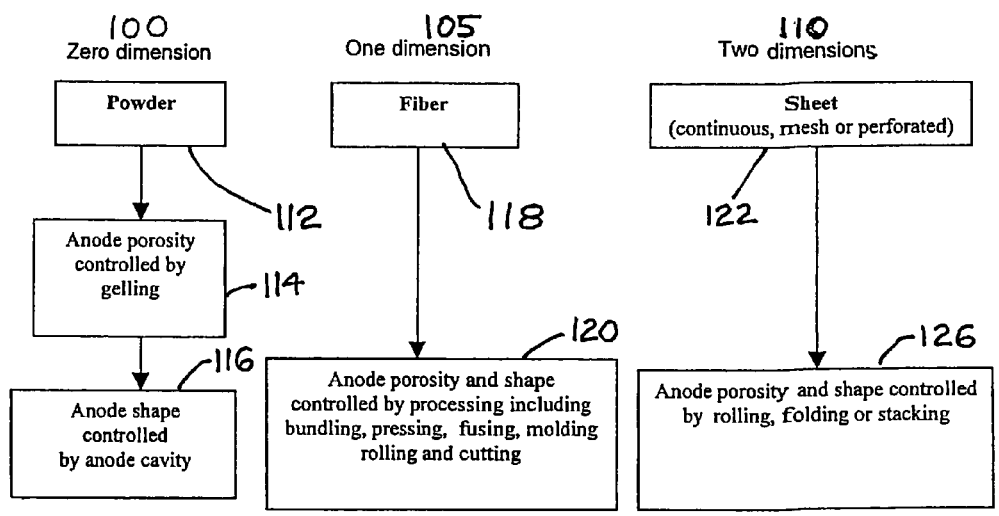
FIG. 2 illustrates three typical processing methods for controlling the porosity and shape of zinc anodes using different forms of materials for battery applications.

FIG. 2 illustrates three typical processing methods for control of anode porosity and shape for materials of zero-, one- and two-dimensional forms, of zinc anodes for battery applications, according to one aspect of the invention. Specifically, FIG. 2 illustrates three methods of processing powder 100 (zero dimension), fiber 105 (one dimension) and sheet 110 (two dimension). In process 100, the powder 112 used as an anode is porosity controlled 114 and then the anode shape is controlled by anode cavity 116. In process 105, the fiber 118 has its anode porosity and shape controlled by processing including bundling, pressing in die or fusing 120. In process 110, the sheet 122 is anode porosity and shape controlled directly, by rolling, folding or stacking 126.

Figure 3:
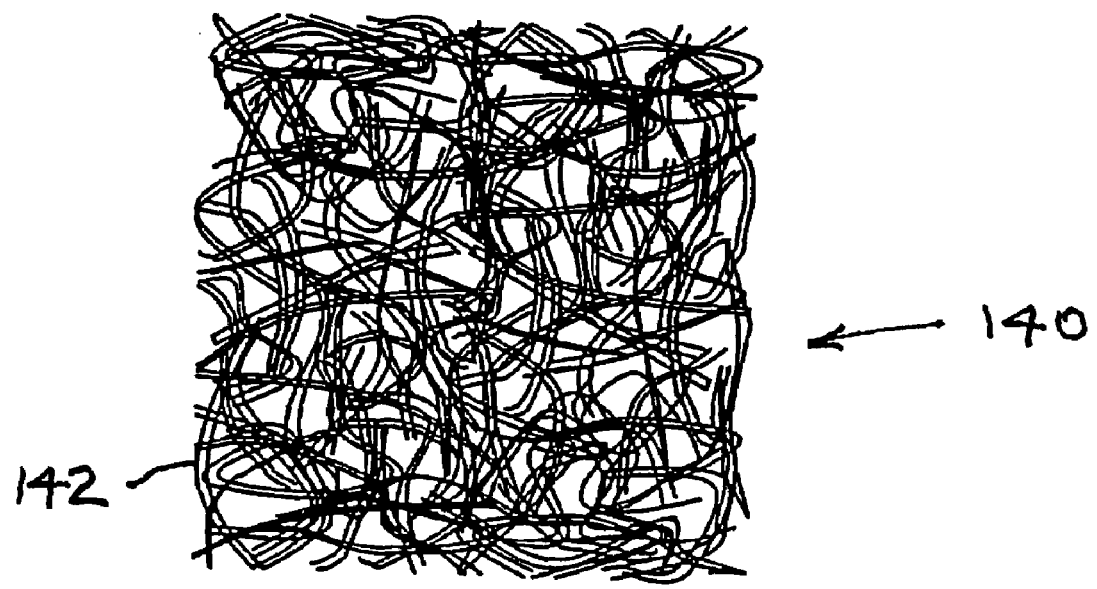
FIG. 3 represents a schematic illustration of a mass of fibrous wooly zinc material.

The solid porous electrode (sometimes referred to herein as wooly material or wooly zinc material or SPE) disclosed in this invention allows for the independent control of surface area and porosity over a wide range while maintaining electrical connectivity of the electrode material with no need of using a gelling agent as illustrated in process 105 in FIG. 2. FIG. 3 represents a schematic illustration of a mass of fibrous wooly zinc material. The advantage of a solid electrode made of wooly zinc material, such as 140 illustrated in FIG. 3, is that each fiber, filament, strand or thread of wool 142 is physically connected with a number of other wool fibers, filaments, strands or threads and linked together as a solid form. The density and porosity is then controlled by the degree of confinement of the wooly materials under mechanical pressing either uniformly or in dense and less dense patterns as described in this specification. This allows for the fabrication of a solid and conductive zinc anode with a wide range of porosity, as for example, as shown in Table 1, with 47% to 94% corresponding to densities of 3.8 $g/cm^3$-0.46 $g/cm^3$.

TABLE 1

Density of free-standing porous solid electrode made from wooly material

| Solid Anode | Form | Dimension, cm. | Density, g/cm³ |
|---|---|---|---|
| 1 | Molded Cylinder | Ø 1.4 × 4.2 | 0.46 |
| 2 | Molded Cylinder | Ø 1.5 × 4.2 | 0.84 |
| 3 | Molded Cylinder | Ø 1.54 × 4.2 | 1.8 |
| 4 | Molded Cylinder | Ø 1.54 × 2.9 | 3.1 |
| 5 | Rolled Plate | 6.5 × 4.5 × 0.26 | 1.6 |
| 6 | Rolled Plate | 6.3 × 4.2 × 0.9 | 0.3 |
| 7 | Rolled Plate | 6.5 × 4.3 × 0.08 | 1.6 |
| 8 | Rolled Plate | 13 × 9 × 0.45 | 2.0 |
| 9 | Rolled Plate | 6.7 × 4.4 × 0.13 | 3.8 |
| 10 | Rolled Plate | 6 × 4 × 0.04 | 2.9 |
| 11 | Rolled Cylinder | Ø 1.5 × 4.0 | 1.62 |
| 12 | Rolled Cylinder | Ø 1.54 × 4.1 | 2.14 |

In one aspect, the subject invention is directed to solving the problems of independent control of particulate connectivity, electrode conductivity, porosity, surface area, mechanical stability, and form factor (shape and dimension) of zinc anodes in order to significantly improve the performance and economics of batteries or fuel cells.

Figure 4:
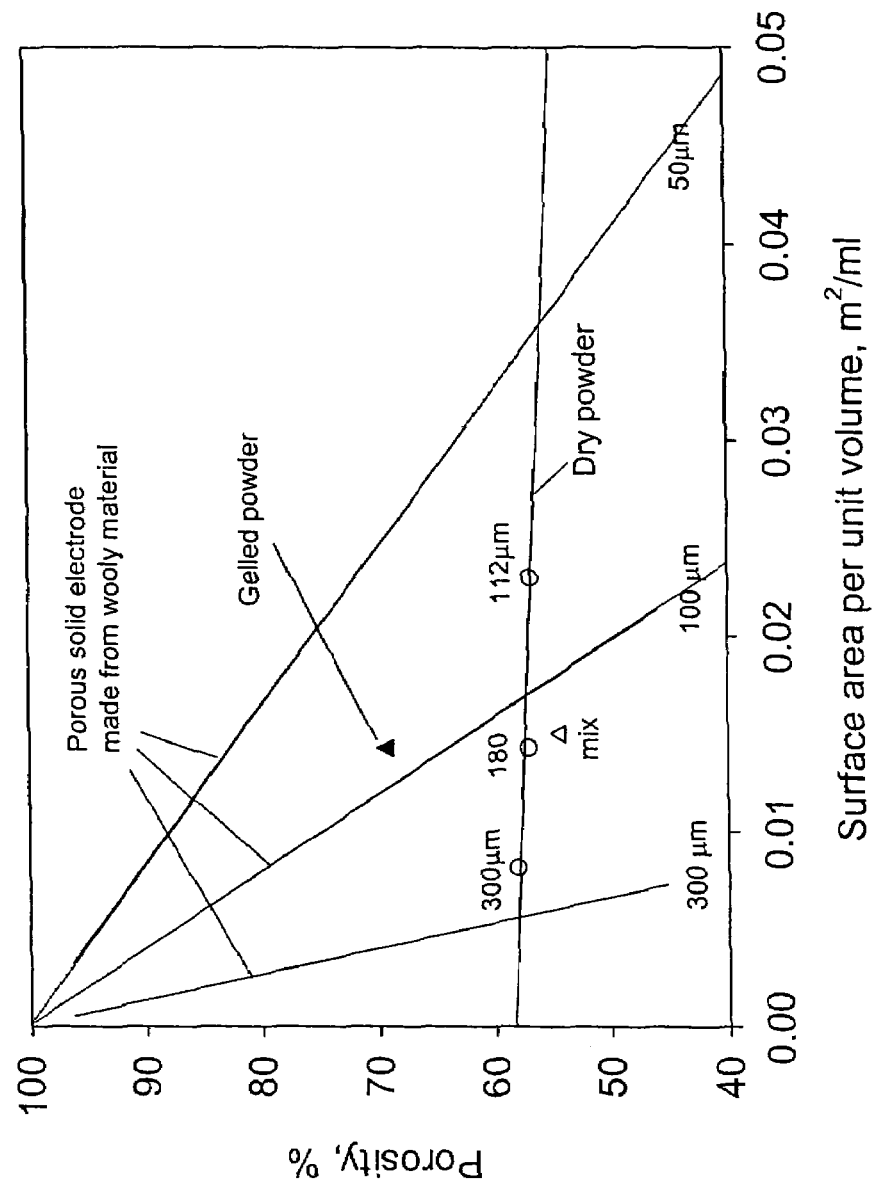
FIG. 4 illustrates a graphical depiction of the relationship between porosity and density of effective surface area for atomized zinc powder and solid porous electrode made from wooly zinc material.

FIG. 4 illustrates a graphical depiction of the relationship between porosity and density of effective surface area for atomized zinc powder and solid porous electrode made from wooly fibrous zinc material. The values of the particle sizes provided in the figure are the nominal average values for the powders and wools. The corresponding surface area per unit volume for the powders and fibers are based on a calculation of geometric shape for spherical powder particles and cylindrical fibers. The value of surface area per unit volume for actual material of similar average physical dimension may be significantly different due to the particular size distribution and the fine surface texture of the material. Porosity was determined by measuring the density of the zinc powder and wool materials. Surface area was calculated assuming a spherical shape for the powder particles and a cylindrical shape for the wools. The actual surface area is generally larger due to the irregular shape of individual particles and surface roughness of the wools.

Specifically, FIG. 4 shows a comparison of control between atomized powder and a solid porous electrode (SPE) according to the invention in terms of surface area density, defined as the effective surface area of material in a unit volume, and porosity defined as the percentage of the non-solid volume in the gross space occupied by the anode. For atomized zinc powder, porosity varies only slightly with surface area. The data point labeled "mix" on the graph, which is the mixture of the three different sizes of zinc particles, has a lower porosity than the non-mixed particles. This is reasonable because in a mixed powder the larger space between the larger particles tends to be filled by the smaller particles, thus making a denser body. On the other hand, with the solid wooly porous electrode, porosity can vary over a wide range with surface area and equally important, both surface area and porosity can vary over a wide range by varying the diameter of the wool fibers in the solid anode. It is notable that the solid triangular dot, which is the gelled form of the powder mix, has a much higher porosity than non-gelled powder (open triangular dot) but it is still much less than what is achievable by the solid porous wooly fiber electrode according to the invention.

Figure 5:
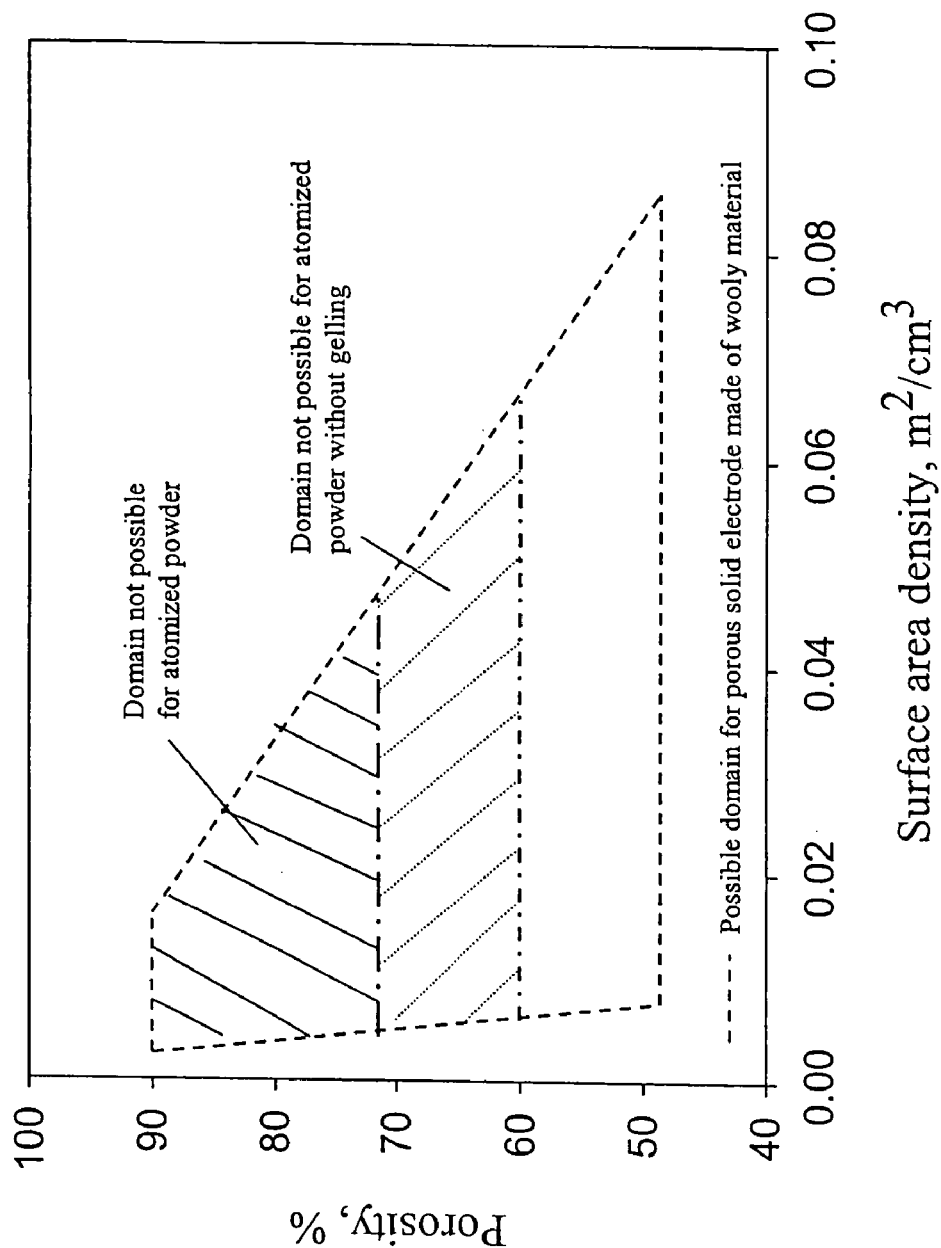
FIG. 5 illustrates a graphical depiction of domains of possibility in the design of porosity and surface density for atomized zinc powder and solid porous electrode.

FIG. 5 illustrates a graphical depiction of domains of possibility in the design of porosity and surface density for atomized zinc powder and solid porous electrode. Using the data in FIG. 4, FIG. 5 illustrates the advantage of a solid porous electrode over conventional atomized powder in terms of the range of porosity and surface area density that can be achieved for battery anode design. The top domain denoted by the solid cross-hatched dotted area is not possible for atomized powder with or without gel.

Since the performance of an anode is a result of the combined effect of the various materials and processing parameters that are involved in the making of the anode and the battery, a set of materials and processing conditions have to be developed for any fibrous material, in order to demonstrate the actual utility of the material. Similar to what can be said about powder, for example, two different fibrous materials having the same specific surface area or porosity, can have a performance which is very different depending on other materials and processing conditions. The subject invention demonstrates that spin-formed zinc wools, constructed according to the invention, can be used to make anodes that have superior performance as conventional zinc powder anodes.

A principal practical advantage of the subject invention over existing battery practices is the development of an integral approach and system control of the method and process of making solid porous anodes using spin-formed zinc wool compressed of fibers, filaments, threads, or strands, to achieve better electrode conductivity and mechanical stability, better distribution of solid porous space, and effective surface area and improved battery performance under high rate discharging conditions.

Figure 6:
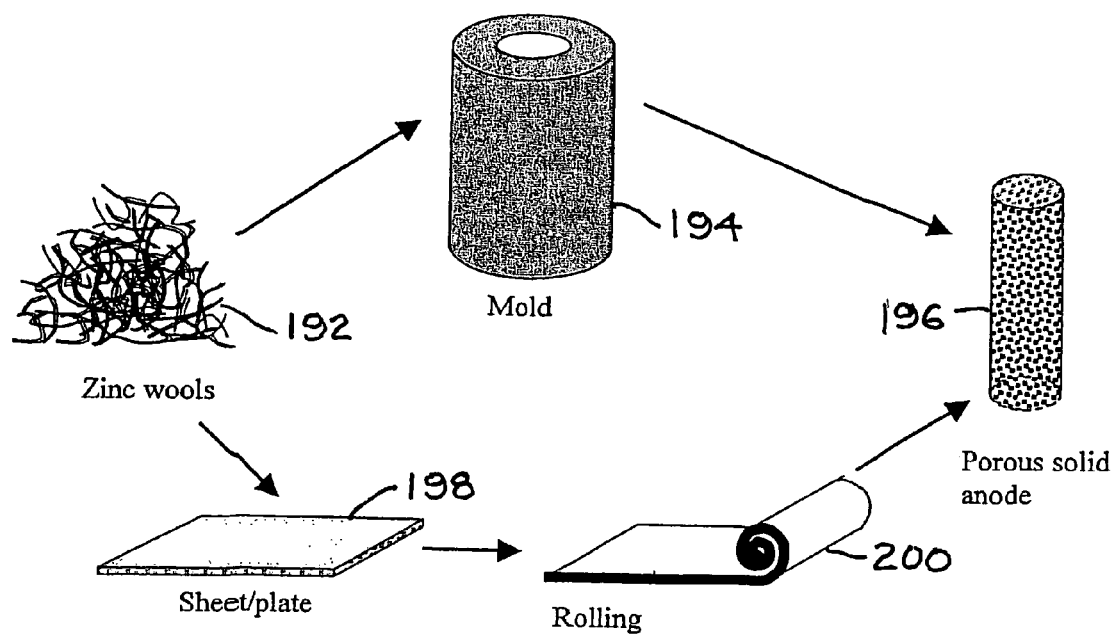
FIG. 6 depicts a schematic illustration of two alternative processes of forming a cylindrical solid porous electrode of wooly zinc material by either using a mold to form the material into the final cylindrical form and size, or by pressing the wooly material into a sheet or plate and then rolling the sheet to the final form and size of the cylinder.

The wooly fibrous zinc material can be pressed with or without a die into sheets, plates or cylinders or any other conceivable practical forms that have density, porosity and surface area that are desirable for the specific design of the batteries or fuel cells. The sheet form can also be further cut into desirable dimensions and stacked or rolled into a final shape and size. FIG. 6 schematically illustrates substantially two different alternative ways of making a solid porous anode; first, by pressing zinc fibrous wools into a mold, and, second, by first producing the sheet and then rolling the sheet into the desired diameter. As can be seen in FIG. 6, wooly zinc fiber 192 can be pressed into a mold 194 to form a roll 196. Alternatively it can be pressed into matting 198 of uniform density which is rolled as shown at 200 to form the roll 196. The fabricated sheet, plate, cylinders or other forms, can then be sectioned into anodes to adapt to specific sizes or shapes for designed batteries and applications.

Figure 7:
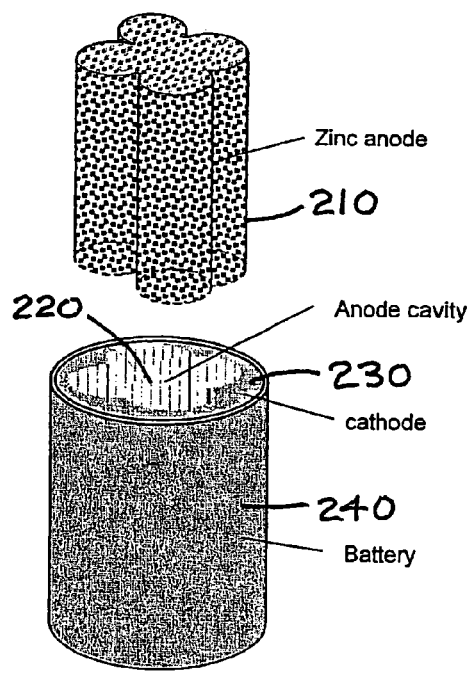
FIG. 7 depicts a schematic illustration of a zinc anode of non-cylindrical geometry for application in a conventional alkaline battery.

The use of molding has enabled more complex geometric shapes of anodes to be produced. Cell designs that use complex geometric shapes of anodes provides larger anode/cathode interface area compared with conventional designs. FIG. 7 depicts a schematic illustration of a zinc anode 210 of non-cylindrical geometry which can be inserted in a congruent mode cavity 220 formed inside a cathode 230 of a battery 240. Other forms of anodes can be constructed by using different forms of molds.

Figure 8:
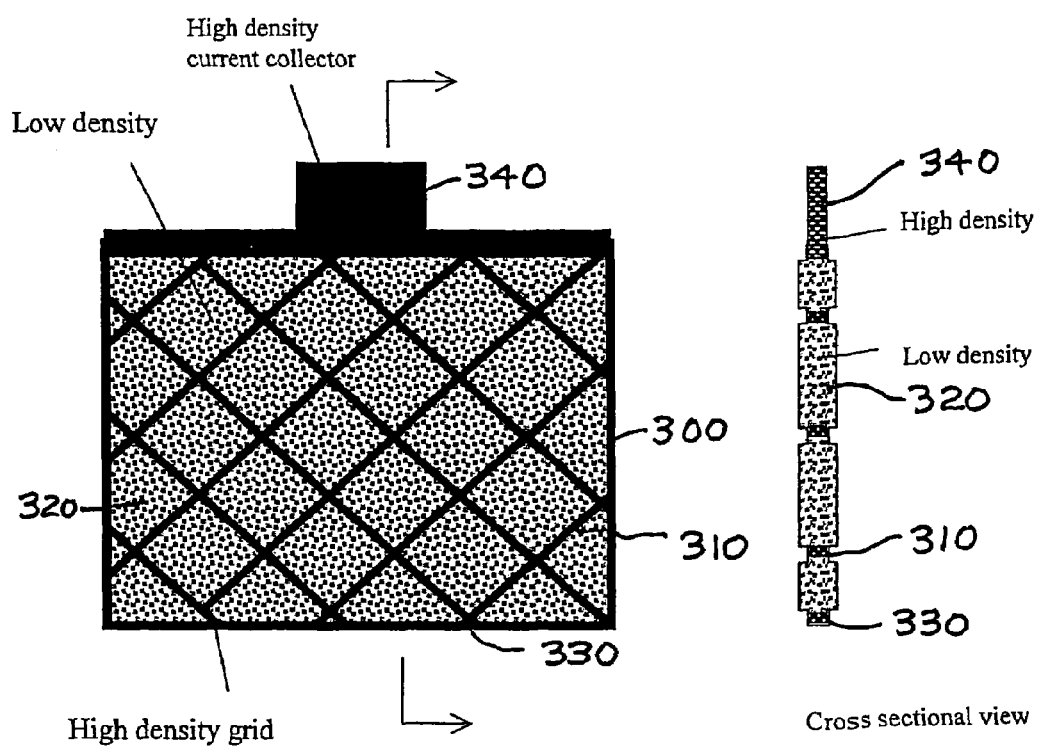
FIG. 8 illustrates front and cross-sectional views of a solid porous zinc anode which has been formed to have a grid pattern of high and low density areas.

For application in mechanically refuelable batteries or fuel cells, the preferred practice according to the invention is to press the wooly fibrous zinc material into a solid plate of specific density distribution, either of uniform or non-uniform density. To enhance the mechanical stability of the anode, it is preferable in some cases to press a grid of narrow area, including a tab as a current collector, to a significantly higher density than the non-grid area as shown in FIG. 8 which is similar to FIG. 1(b) but illustrates in detail the front and cross-sectional views of a zinc anode 300 which has a diagonal grid pattern 310 of dense fiber area and in-between low density areas 320 enclosed by a dense border 330 connected to a high density current collector 340. The anode shown in FIG. 8 is suitable for mechanically refuelable zinc batteries and fuel cells. The entire grid area of the plate including the current collector 340 is significantly denser than the rest of anode area such that the grid 310 is strong and the rest of the lower density area 320 has high porosity for storing electrolyte. The density of the denser area 310 (i.e. grid and current collector) can be as high as 7.13 g/cm$^3$, which is the bulk density of zinc. The denser grid 310 not only provides more mechanical strength to the anode 300 but also provides better current conductivity for the anode because the dense zinc grid 310 is distributed over the entire anode surface and has an electrical continuity with the current collector 340. The number, size and shape of the grid openings may vary depending on the design and performance requirements of the anode. As well, the thickness and density of the grid can vary depending on mechanical strength and electrical conductance required for the anode. Plates with denser areas are stronger tan ones having uniform density, although it should be noted that plates with uniform density are not excluded from the scope of the invention. Such anode plates made with wooly material in dense grid patterns can be bent without breaking as shown subsequently in FIG. 19.

Figure 9:
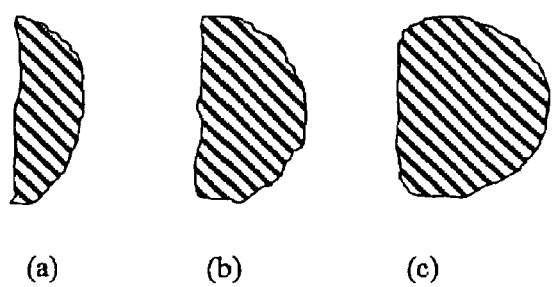
FIG. 9 illustrates cross-sectional views of individual fibers of three different wooly zinc materials.

The mean density of the solid anode is preferably in the range of 1-3 g/cm$^3$ (general range of 0.5-6.3 g/cm$^3$). In the electrode, the more densely compressed areas may have a density in the range of 2.5 g/cm$^3$ to 7.13 g/cm$^3$ and the less densely compressed areas may have a density in the range of 0.5 g/cm$^3$ to 6.3 g/cm$^3$. The more densely compressed areas may have a density in the range of 2.5 g/cm$^3$ to 7.13 g/cm$^3$ and the less densely compressed areas may have a density in the range of 0.5 g/cm$^3$ to 3 g/cm$^3$. Preferably, the more densely compressed areas may have a density in the range of 3.5 g/cm$^3$ to 6.3 g/cm$^3$ and the less densely compressed areas may have a density in the range of 1 g/cm$^3$ to 3 g/cm$^3$. It is made by pressing a wooly material that is spin formed from molten zinc. FIG. 9 illustrates cross-sectional views of individual strands (fibers) of three different wooly zinc materials (a), (b) and (c). As can be seen, the zinc wools have an uneven surface and are roughly half-round (a cross-section more or less like a half-moon shape) with a nominal diameter between preferably 4-130 µm (general range 15-300 µm), and a length between 5-65 mm (general range 2-500 mm). The middle thickness of the half moon may vary to some extent and the surface may have a certain texture of crystal grains resulting from the solidification process. The real surface area of a single fiber is thus generally larger than that calculated from the geometrical form with a smooth surface.

Figure 10:
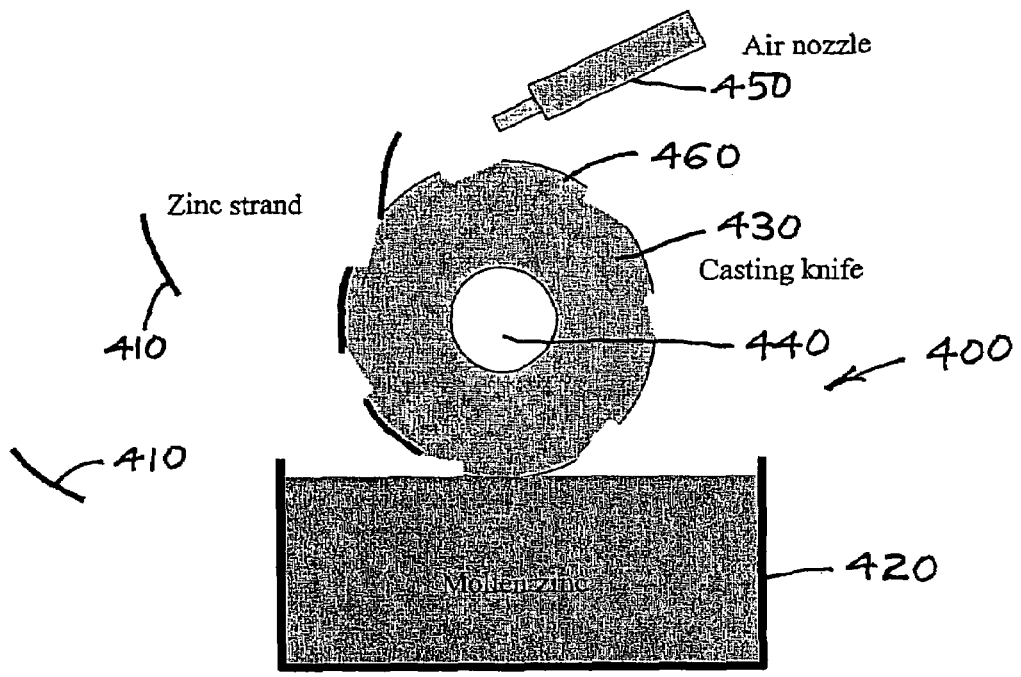
FIG. 10 depicts a schematic illustration of an apparatus and method for the manufacture of wooly zinc fiber material by spin forming from a molten zinc bath.

As mentioned above, the wooly zinc material according to the invention can be manufactured by spin forming from molten zinc. FIG. 10 depicts a schematic illustration of apparatus 400 for the production of wooly zinc fibers 410 by spin forming from a molten zinc bath 420. The notched casting knife 430 is mounted on a hollow stainless shaft 440, in which cooling water passes to remove the heat of solidification. It will be understood that the shaft 440 can have a series of knives 430 thereon, but only one is mentioned in this discussion. The knife 430 rotates and spin forms zinc strands 410 which are dislodged by an air nozzle 450. The knife 430 has a sharp edge 460.

Figure 11:
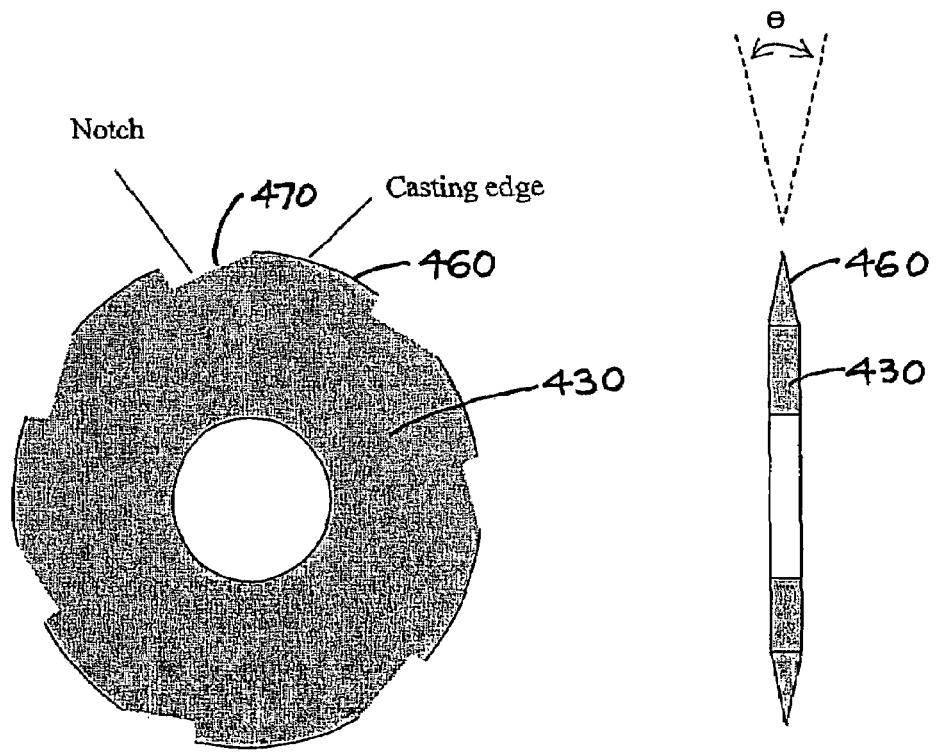
FIG. 11 depicts a detailed schematic illustration front and cross-sectional views of the circular notched knife for forming wooly zinc fiber material from molten zinc.

FIG. 11 depicts a detailed schematic illustration of front and cross-sectional views of the circular knife 430 for forming the wooly zinc strands 410 from the zinc bath 420. The knife 430 has notches 470 distributed around its circumference. The thickness of the knife edge is between 10-50 µm (generally 5-200 µm) and the tapered angle to the edge, e, is less than 30° as shown in FIG. 11. The air nozzle 450 located at the top of the knife dislodges the strands or fibers 410 of zinc from the edge of the knife 430. While not shown, the zinc strands 410 fall onto a conveyor belt, which carries them to a collector which collects the strands (fibers) to form a stack of uniformly distributed wooly material. The stack of wooly material is removed once it reaches a certain thickness or weight. The collector can move horizontally in both the x and y directions to secure uniform loading of the wools. The temperature of the molten zinc bath 420 is generally between 430° C.-650° C. (preferably 450-550° C.). The rpm of the rotating knife, or knives if mounted in series, is generally between 250 and 2000 (preferably between 300 and 500 rpm).

Zinc anodes used in batteries can be alloyed with various metals to enhance performance in terms of corrosion resistance and discharging current density. These alloying elements include, but are not limited to, Bi, In, Ca, Al, Mg, Ga, Sn, Pb, Cd. Other materials, such as polymeric fibers and water absorbing pellets, may be mixed with the zinc fiber and pressed into a solid form to achieve desirable effects.

In a further embodiment of the invention, the zinc is alloyed with 100-1000 ppm of Bi to provide high surface activity for discharge. It can also be alloyed with 100-1000 ppm In or 100-1000 ppm In plus 100-1000 ppm Bi. Zinc wools produced with these alloys have been found to have good surface activity under high discharging current. Also, the wooly material made of such alloys has a low gassing rate.

Figure 12:
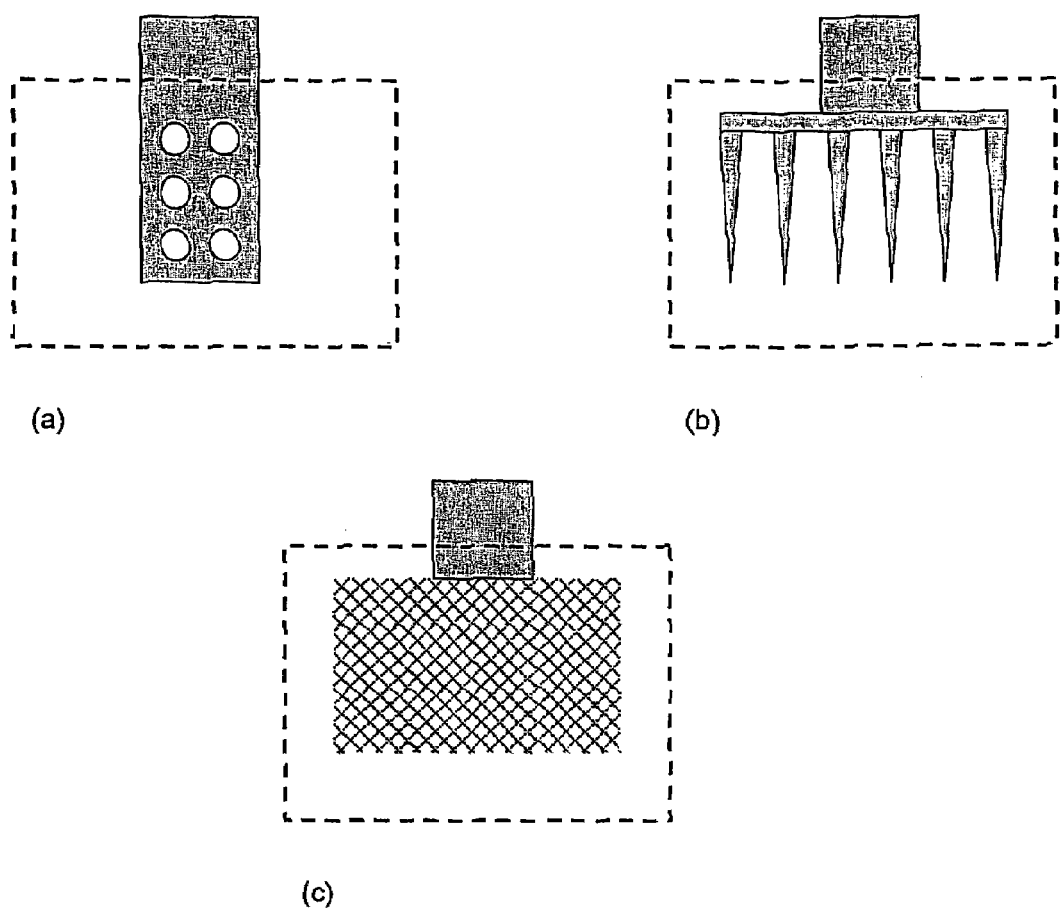
FIG. 12 depicts three schematic illustrations of solid porous anodes with different designs of current collectors.

Anodes made according to the invention can have many forms and variations. The anodes may contain a strip of solid or mesh metal, or partly strip and partly mesh material as current collectors as illustrated FIG. 12, which depicts three schematic illustrations of solid porous anodes with three different designs of current collectors (a), (b) and (c), namely a perforated tab, a fork and a rectangular mesh. The metals used for making the current collector can be zinc, copper, tin, silver, nickel, titanium, magnesium and alloys of these metals. They can also be further plated or clad with another metal such as silver, tin or copper, for better conductivity.

Figure 13:
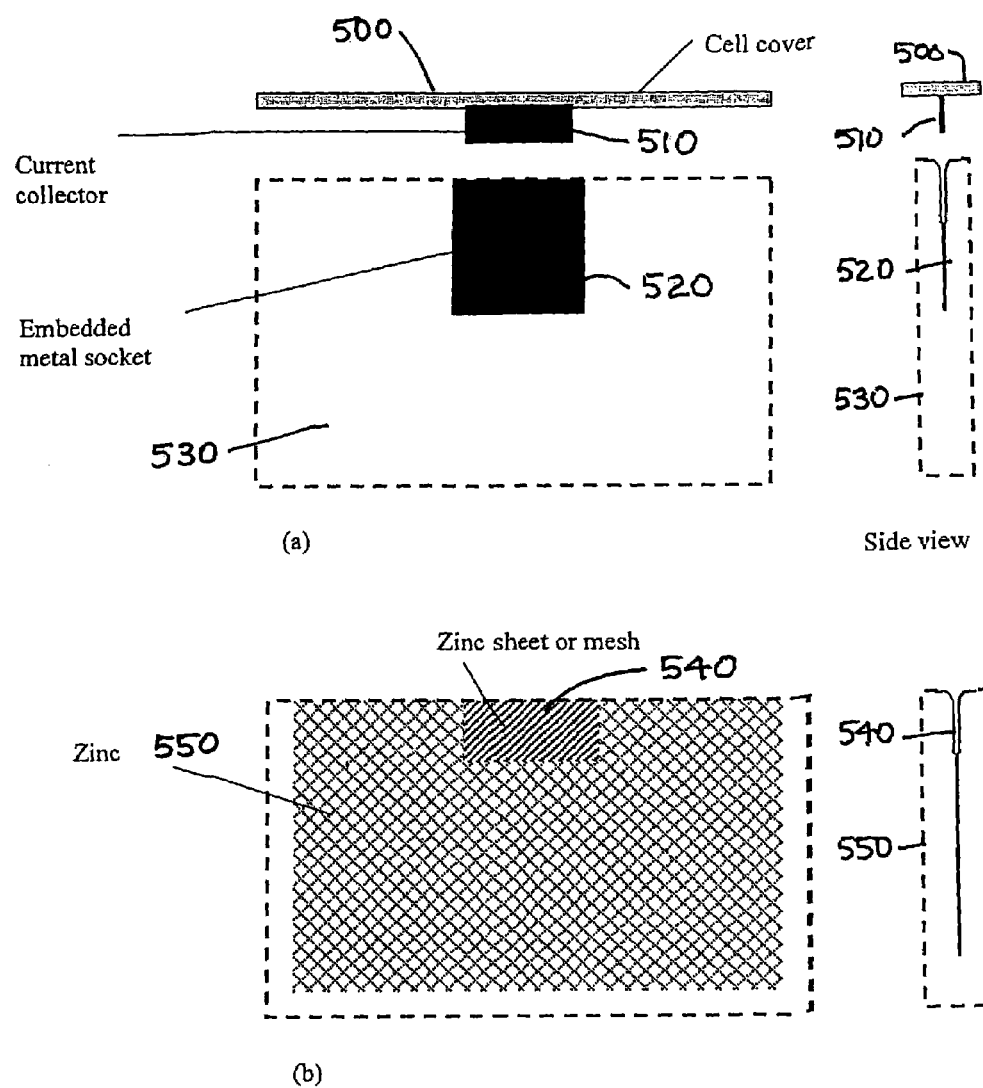
FIG. 13 depicts schematic illustrations of two different embedded current collector constructions.

Other forms of current collectors can be used. A strip or mesh of metal may be designed such that it is fully embedded in the anode body and has a socket on the top thereof for allowing the insertion of a separate current connector (the male part of the current connector is attached to the cover of the cell). FIGS. 13(a) and (b) depict schematic illustrations of two different embedded current collector designs. Specifically, FIG. 13(a) illustrates a cell cover 500 with a current collector 510 which fits in an embedded metal socket 520 in the anode 530. FIG. 13(b) illustrates a zinc sheet or mesh 540 embedded in a zinc grid 550 which forms part of the anode. The embedded part of the current collector can be made of zinc which thereby avoids any galvanic corrosion of the zinc anode due to contact with another metal, such as copper, and allows the discharged anode, including the current collector, to be reprocessed without the need of removing the current collector.

Figure 14:
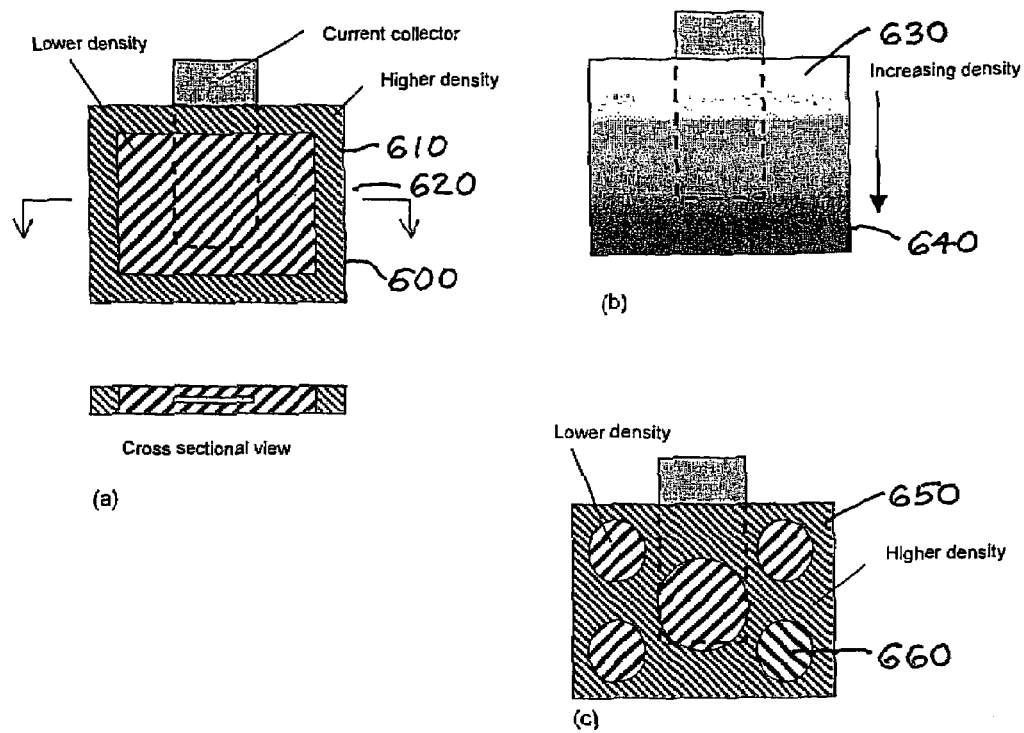
FIG. 14 depicts schematic exemplary illustrations of three anodes with varying zinc fiber material density, namely, (a) an edge of the anode plate being denser than the interior; (b) a top of the anode plate being of different density from the bottom; and, (c) a connected area of the anode plate being denser than the discrete patches.

In further embodiments, the anode can have varied density from the middle to the edge, from the top to the bottom, or in selected areas as shown in the FIG. 14. Specifically, FIG. 14 schematically illustrates an anode with varying material density, namely, in (a) the edge or border 610 of the anode plate 600 is denser than the interior 620, in (b) the density at the top of the anode plate 630 is less than the bottom 640, and, in (c) the connected areas 650 of the anode are denser than the discrete patches 660. It will be understood that the three configurations shown in FIG. 14 are only exemplary and other configurations within the scope of the invention are possible to suit specific applications. Such configurations allow the anodes to have improved performance characteristics. For example, an anode can have a denser edge than the middle (a) to give mechanical stability to the anode but also to provide a lower density middle area of higher porosity for storing electrolyte. The variation of density from the top to the bottom (b) provides the possibility of an anode design in situations where there is a variation of electrolyte density or temperature from the top to the bottom. In (c) the distribution of the high density area 650 with discrete areas 660 throughout the anode enables a distribution of strength throughout the anode. A preferable approach in making the anode is to have a denser grid over a less dense plate. The size of the individual grid may vary and a border for the grid may or may not be needed depending on the particular design. The solid anode with a denser border or grid allows the anode to have a large average porosity and at the same time be mechanically strong.

Anodes produced according to the invention can be included directly in a battery production line or can be wrapped in a battery separator and packaged and then either stored for future use or shipped to a different location for placement into a battery or fuel cell.

The anodes can be soaked in electrolyte, typically KOH, with a concentration between 25% and 45% prior to placement into a battery, or alternatively, the anodes can be placed into batteries before loading the electrolyte into the batteries. The KOH electrolyte may also be thickened with a gelling agent when desirable.

The wooly zinc material according to the invention may be pressed with a plastic mesh or cloth to prevent the wooly zinc material from falling from the solid anode surface. A sheet of separator material may also be pressed onto the wooly zinc anode surface, which thereby allows simplification during cell assembly.

Figure 15:
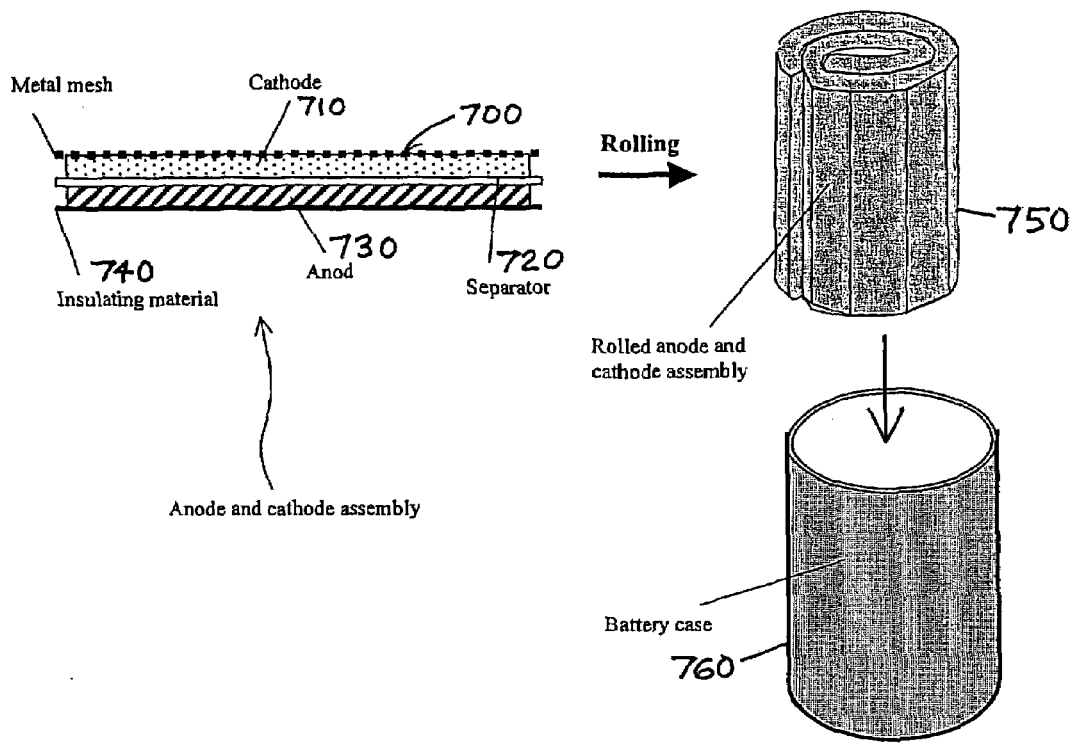
FIG. 15 depicts a schematic illustration of a process for making a rolled cylindrical anode/cathode assembly that has a large anode/cathode interface area for alkaline batteries of cylindrical design.

The solid porous zinc anode made of wooly zinc fiber material according to the invention may in another embodiment be used to make an anode and cathode assembly as illustrated in FIG. 15. As seen in FIG. 15, a layered composite made of metal mesh 700, cathode 710, separator 720, anode 730 and insulating material 740 is rolled into a cylinder 750 and then inserted in a hollow battery casing 760. In such an instance, the density of the wooly zinc anode 730 is generally uniform throughout its area. Such an assembly has a large anode/cathode interface area and thus can provide high discharge power for alkaline batteries of cylindrical design.

Apart from spin forming, the fibrous zinc materials may be produced by other methods such as machining etc. for making the solid porous wooly zinc electrodes as disclosed in this application.

The anode current collector (of any form) can be installed into the anode prior to the anode being installed in the battery, or the current collector may be inserted in the anode after the anode has been inserted into the battery. The current collector can serve to enhance mechanical integrity of the electrode that is made of wooly zinc fiber material. The current collector can be constructed of expanded zinc mesh of a design that will provide a suitable or optimum performance/mesh weight ratio for the anode.

EXAMPLE 1

A group of commercial alkaline C cells marketed by a major battery manufacturer were purchased within three weeks of each other with expiry dates of 2010. The original commercial cells were cut from the top and the zinc anode paste (zinc powder and KOH gel) was removed. The weight of the four solid porous anodes was in the range between 10.20 g and 12 g. The electrolyte added into the testing cell was 8.4 g of 35% KOH. A solid electrode was formed by first pressing zinc wools on a layer of plastic wool mesh into a sheet of 37 mm in width, 90 mm in length and about 2 mm in thickness. The layer of fabric mesh prevented the broken zinc wools from falling off the electrode during the step when the zinc wool sheet was rolled to a diameter of about 15 mm. The rolled anode was wrapped in a piece of separator and inserted into the cell cavity. The wool used was an alloy with 500 ppm Bi and had a near rounded cross-section of average diameter of about 70 μm and a nominal length of 1.8 cm. The discharge was conducted at a constant current of 1 A at room temperature of about 22° C.

Figure 16:
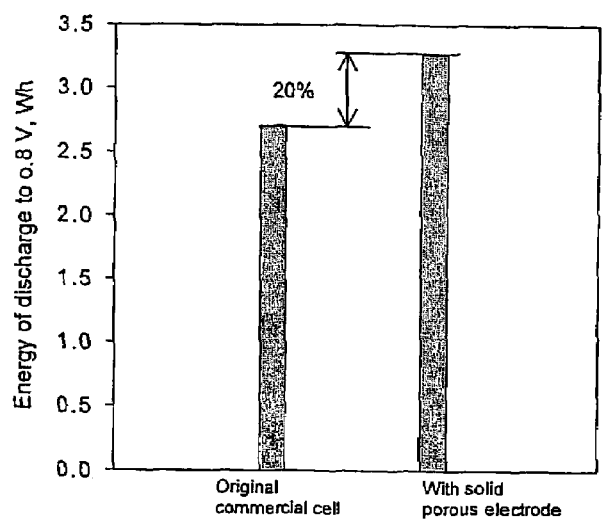
FIG. 16 depicts a graphical illustration of comparative discharging results for a commercial C cell and an altered commercial C cell equipped with a solid porous zinc anode according to the invention.

This example demonstrates the improvement of discharging performance of the battery cell using solid porous zinc electrode over the original commercially available battery cells. In this particular set of experimental conditions, as much as 20% improvement was achieved, as illustrated in FIG. 16. Specifically, FIG. 16 shows average discharging energy for an original unaltered commercial C cell 422 and a commercial C cell equipped with a solid porous wooly zinc anode according to the invention. As can be seen, the cell with the solid porous wooly zinc anode was 20% superior in performance.

EXAMPLE 2

Figure 17:
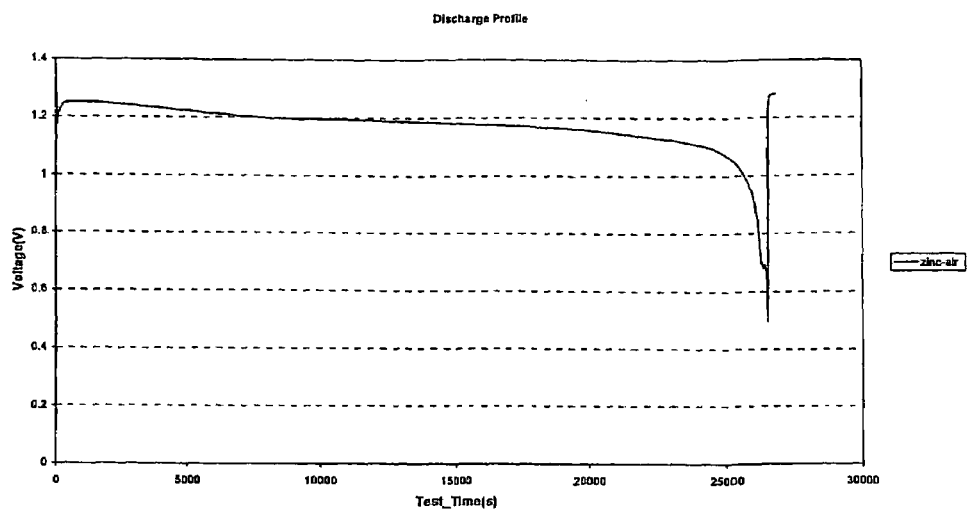
FIG. 17 depicts a graphical illustration of a discharging curve of a zinc-air cell with a solid porous zinc anode at a constant current of 1A.

This example demonstrates the application of solid porous wooly zinc electrodes for a zinc-air cell. In this test, the solid porous wooly zinc electrode weighed 9.7 g and was a plate with dimensions of 4.5 cm×6.5 cm×0.3 cm, which was pressed with a zinc wool alloyed with 500 ppm Bi. The electrode had a density of 1.1 g/cm$^3$ and porosity of 84.7%. The anode was fully immersed in 12.8 g of 35% KOH in an in-house made cell. FIG. 17 shows a graphical illustration of a discharging curve of a zinc-air cell with a solid porous zinc anode at a constant current of 1 A. As shown in FIG. 17 with discharging of the solid porous electrode at a constant current of 1 A, the total discharging time to cut off voltage of 0.8 V was 7.2 hours thereby giving a capacity of 7.2 Ah. The theoretical value for zinc is 0.82 Ah/g. Thus, the material utilization efficiency was 91%.

EXAMPLE 3

This example further illustrates the improved performance of a solid porous wooly zinc electrode under a diverse range of materials, processing and anode design conditions. Commercial cells were supplied by a major battery manufacturer with expiry dates of 2010 and were tested within four weeks of purchase. In this example, original commercial cells were cut from the top and the zinc anode paste (zinc powder and KOH gel) was removed. The weight of the four solid porous anodes was in the range between 9.9 g and 10.9 g. The electrolyte was 35% KOH and an amount of 7.5 to 8.3 g was added into the testing cells. The fibrous wool used was an alloy of zinc with Bi, or zinc and In or Zinc with Bi and In, having a near rounded cross-section of average diameter of about 70 μm and a nominal length of 1.8 cm. The discharge was conducted at a constant current of 1 A and at room temperature of 22° C. One anode was made by pressing the wooly material in a mold. Another anode was rolled from a pressed sheet.

Table 2 below shows that the solid porous electrodes prepared according to the invention outperform, by 12%-24% in discharging energy, commercially available cells under a wide range of conditions.

TABLE 2

Examples of discharging energy of solid porous electrodes

| Electrode | Wooly Zn material | 35% KOH, g | %, improvement |
|---|---|---|---|
| 1 | 10.5 g, 500 ppm Bi | 7.8 | 14 |
| 2 | 10.8 g, 500 ppm Bi | 8.3 | 24 |
| 3 | 9.9 g, 500 ppm Bi | 8.0 | 16 |
| 4 | 10.9 g, 200 ppm Bi | 7.5 | 13 |
| 5 | 10.8 g, 500 ppm Bi | 8.0 | 13 |
| 6 | 11.9 g, 250 ppm In + 250 ppm Bi | 8.4 | 17 |
| 7 | 11.9 g, 500 ppm In + 500 ppm Bi | 8.4 | 12 |
| 8 | 11.9 g, 250 ppm In | 8.4 | 17 |

Note:
% improvement was obtained using the average value of discharging energy at 0.8 V cutoff cell voltage for three cells with the solid electrode divided by the average discharging energy of the three original commercial cells.

EXAMPLE 4

Figure 18:
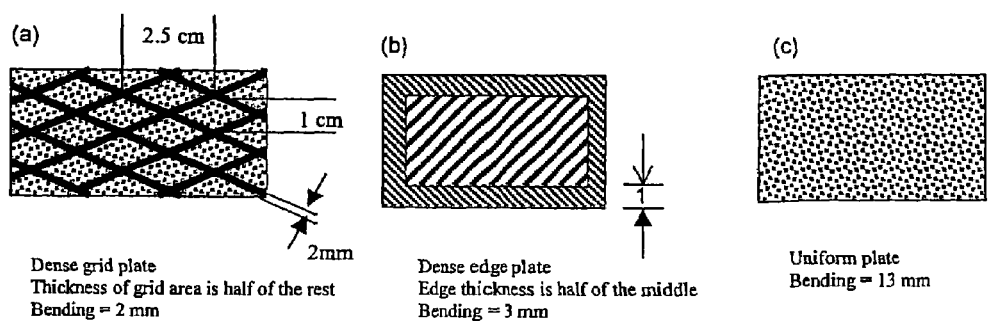
FIG. 18 illustrates schematic depictions of a mechanical strength test for three embodiments of plates with dimensions of 13×9 cm and thicknesses of 4.5 mm which are placed on a flat surface with 5 cm of each plate extending over the edge of the surface.
Figure 18:
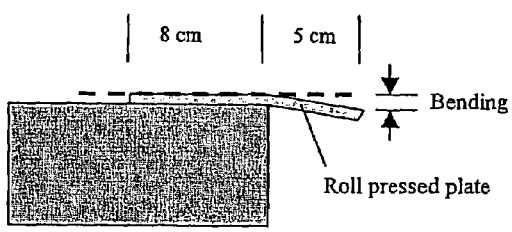

This example, as depicted in FIG. 18, shows the effect of varying density of anode border and grid of narrow areas on the mechanical strength of three designs of anode plates namely, (a) a dense diagonal grid plate, (b) a dense edge plate, and (c) a uniform plate. The mechanical strength tests involved plates with dimensions of 13×9 cm and thicknesses of 4.5 mm, which were placed on a flat surface with 5 cm of each plate hanging over the edge of the surface. The vertical distance due to the natural bending caused by gravity was measured as "bending" for assessment of mechanical strength.

Figure 19:
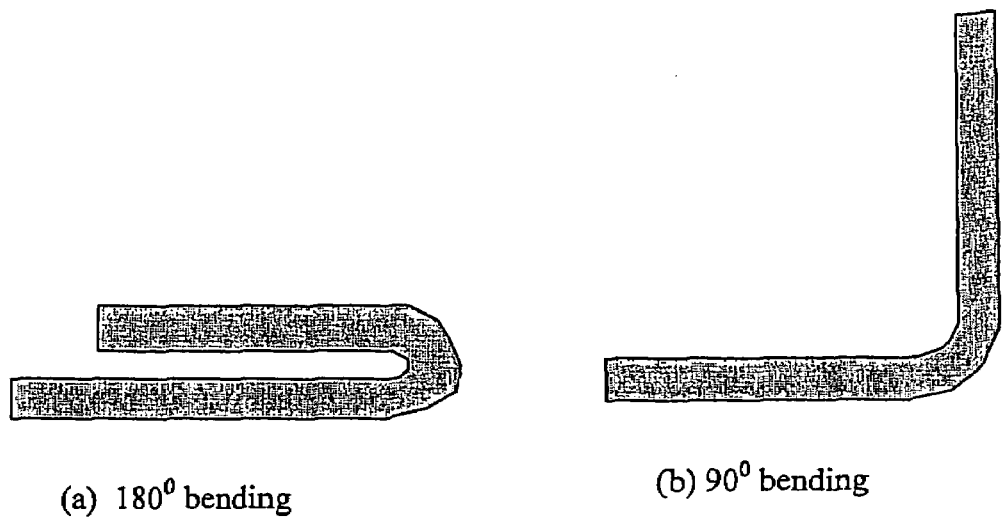
FIG. 19 depicts a schematic illustration of a bending test of a solid porous anode plate subjected to: (a) 180° bending, and (b) 90° bending.

FIG. 19 depicts a schematic illustration of a bending test conducted on a solid porous anode plate which was subjected to (a) 180° bending; or (b) 90° bending. It was found that the plate made of wooly fibrous zinc material could be bent several times to either 90 or 180 degrees without breaking. On the other hand, a plate made with powdery material such as electroplate zinc powder material (not shown) was found to break with only a few degrees of bending.

EXAMPLE 5

Figure 20:
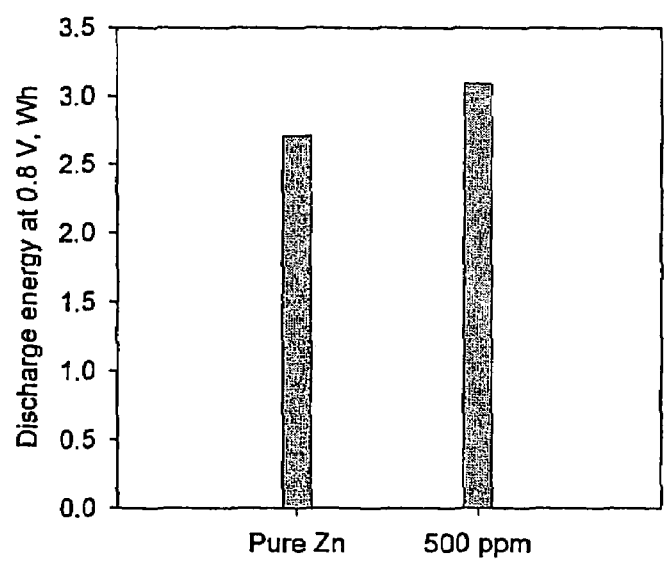
FIG. 20 illustrates a graphical depiction of the comparative discharging energy of an anode constructed of pure wooly zinc material and an anode constructed of a wooly zinc material alloyed with 500 ppm Bi.

This example, as depicted in FIG. 20, shows the effect of alloying on the performance of a solid porous wooly zinc anode in an alkaline cell. FIG. 20 shows the comparative discharging energy of an anode made of pure wooly zinc material and an anode made with a wooly zinc material alloyed with 500 ppm Bi. The testing conditions were the same as that in Example 1. As can be seen, the addition of 500 ppm Bi significantly improved the discharging performance of the anode compared to the pure wooly zinc anode.

EXAMPLE 6

FIG. 21 graphically illustrates the comparative results of a gassing test for wooly zinc material and electroplated dendritic zinc powder. Three grams of each material were placed in 35 ml of 35% KOH for 24 hours. The amount of hydrogen gas resulting from the corrosion of zinc in the electrolyte was measured. As can be seen, the gassing rate of the zinc wool was more than 300% less than that of the electroplated zinc powder.

To improve processibility and strengthen the rolled electrode, and prevent fibers from dropping away, the zinc fiber wools can be pressed onto a layer of separator and fabric mesh as illustrated in FIG. 22. FIG. 22 illustrates a schematic diagram of making solid porous zinc sheet or plate 810 from a thin sheet of backing material 812 and wooly zinc 808. The backing material 812 can be for example, mesh or fabric, made of acceptable materials such as plastic or cloth. In the case of a sheet on a layer of separator, the separator not only strengthens the sheet and facilitates the process of handling and rolling but also removes the step of wrapping in a separator, which is conventional in battery assembly. The anode can be soaked in electrolyte, typically KOH, of a concentration between 25% to 45% vol. prior being put into a battery, or it can be installed in a battery before loading electrolyte into the battery.

Process

A typical overall process of making a solid porous electrode using spun formed metal wool is illustrated in the schematic block diagram shown in FIG. 23. FIG. 23 illustrates a schematic of the steps and options in the process of fabricating solid porous electrode from metallic wool. Molten zinc 942 is spun cast at 944 into a fibrous material 946. It is then passed through a distribution and press stage 948 and formed into a porous solid sheet, rod or plate 950. From there, it can be sent directly to a battery fabrication line 958, or wrapped in a separator at station 954. Alternatively, it can be passed from 950 to a final size and form station 952 and then wrapped in a separator 954.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A solid porous zinc electrode for use in alkaline-zinc batteries, zinc-air batteries or fuel cells comprising a group of zinc fibers, filaments, threads or strands compressed into a mass having a varied density distribution over its area created by compressing the fibers, filaments, threads or strands more densely in some areas than in other areas.

2. An electrode as claimed in claim 1 wherein the more densely compressed areas have a density in the range of 2.5 g/cm$^3$ to 7.13 g/cm$^3$ and the less densely compressed areas have a density in the range of 0.5 g/cm$^3$ to 6.3 g/cm$^3$.

3. An electrode as claimed in claim 1 wherein the more densely compressed areas have a density in the range of 2.5 g/cm$^3$ to 7.13 g/cm$^3$ and the less densely compressed areas have a density in the range of 0.5 g/cm$^3$ to 3 g/cm$^3$.

4. An electrode as claimed in claim 1 wherein the more densely compressed areas have a density in the range of 3.5 g/cm$^3$ to 6.3 g/cm$^3$ and the less densely compressed areas have a density in the range of 1 g/cm$^3$ to 3 g/cm$^3$.

5. An electrode as claimed in claim 1 wherein the group of zinc fibers, filaments, threads or strands are compressed into a physically-stable and physically-continuous mass.

6. An electrode as claimed in claim 1 wherein the fibers, filaments, threads or strands are compressed into a sheet having uniform density at the interior area of the sheet.

7. An electrode as claimed in 6 wherein the electrode has a uniform density distribution over its interior area, said density being in the range of 0.5 g/cm$^3$ to 6.3 g/cm$^3$.

8. An electrode as claimed in claim 6 wherein the electrode has a uniform density distribution over its area, said density being in the range of 1 g/cm$^3$ to 3 g/cm$^3$.

9. An electrode as claimed in claim 1 wherein the more densely compressed areas of fibers, filaments, threads or strands form a grid network and the less densely compressed fibers, filaments, threads or strands occupy the spaces between the compressed grid network.

10. An electrode as claimed in claim 9 wherein the electrode with the grid network is in the form of a plate.

11. An electrode as claimed in claim 10 wherein the plate is adapted for incorporation in mechanically refuelable zinc-air batteries or fuel cells.

12. An electrode as claimed in claim 1 including a current collector made of an electrically conducting material.

13. An electrode as claimed in claim 12 wherein the electrically conducting material is zinc, copper, tin, silver, nickel, titanium, magnesium or alloys of these metals.

14. An electrode as claimed in claim 12 wherein the electrically conducting material is plated or clad with silver, tin or copper.

15. An electrode as claimed in claim 12 wherein the current collector is made of compressed fibers, filaments, threads or strands which form a continuous extension of the grid network.

16. An electrode as claimed in claim 12 wherein the current collector is embedded in the body of the electrode.

17. An electrode as claimed in claim 12 wherein the electrode includes a removable current connector.

18. An electrode as claimed in claim 12 wherein the current collector is formed of zinc.

19. An electrode as claimed in claim 1 wherein the electrode has a dense border around its periphery.

20. An electrode as claimed in claim 1 wherein the electrode is in the form of a cylinder.

21. An electrode as claimed in claim 20 wherein the cylinder is adapted for incorporation in an alkaline zinc or zinc-air battery.

22. An electrode as claimed in claim 1 wherein the zinc fibers, filaments, threads or strands are compressed into a mold to form a solid porous anode.

23. An electrode as claimed in claim 22 wherein the mold has a hollow interior which is of a specified cross-sectional shape and the zinc fibers, filaments, threads or strands are compressed into the hollow interior to form a solid porous anode which is of a shape which is consistent with the shape of the hollow interior.

24. An electrode as claimed in claim 1 wherein the zinc fibers, filaments, threads or strands are compressed into a sheet.

25. An electrode as claimed in claim 24 wherein the sheet is rolled into a cylinder.

26. An electrode as claimed in claim 1 wherein the fibers, filaments, threads, or strands are produced by spin forming, mechanical machining, extrusion, atomizing or casting.

27. An electrode as claimed in claim 26 wherein the fibers, filaments, threads or strands are produced by spin forming from a bath of molten zinc having a temperature between 430° C.-650° C. using a rotating knife which rotates at an rpm between 250 and 2000 rpm.

28. An electrode as claimed in claim 1 wherein the surfaces of the zinc fibers, filaments, threads or strands are uneven and not smooth.

29. An electrode as claimed in claim 1 wherein the cross-sectional peripheral shape of the zinc, fibers, filaments, threads or strands is in the general shape of a partial circle.

30. An electrode as claimed in claim 1 wherein the fibers, filaments, threads or strands are pressed with a plastic mesh or cloth.

31. An electrode as claimed in claim 1 wherein the fibers, filaments, threads or strands are pressed with a separator material.

32. An electrode as claimed in claim 1 wherein the zinc is alloyed with one or more metals selected from the group consisting of Bi, In, Ca, Al, Mg, Ga, Sn, Pb and Cd, before being formed into fibers, filaments, threads or strands.

33. An electrode as claimed in claim 1 wherein the zinc is alloyed with 100 to 1000 ppm of Bi.

34. An electrode as claimed in claim 1 wherein the zinc is alloyed with 100 to 1000 ppm of In.

35. An electrode as claimed in claim 1 wherein the zinc is alloyed with 100 to 1000 ppm of Bi and 100 to 1000 ppm of In.

36. An electrode as claimed in claim 1 wherein the nominal diameter of the fibers, filaments, threads or strands is between 5 and 1000 µm and the length of the fibers, filaments, threads or strands is at least 10 times the diameter.

37. An electrode as claimed in claim 1 wherein the fibers, filaments, threads or strands are pressed together with a sheet of backing material.

38. An electrode as claimed in claim 37 wherein the backing material is selected from the group consisting of paper, cloth, matting or mesh.

39. A method of forming a solid porous zinc electrode comprising a group of zinc fibers, filaments, threads or strands having a nominal diameter between 5 and 1,000 µm and a length of at least 10 times the nominal diameter, which comprises forming the zinc fibers, filaments, threads or strands by utilizing an apparatus which converts zinc into zinc fibers, filaments, threads or strands, which are removed from the apparatus, collected in an area to form a group of fibers, filaments, threads or strands, and compressed into a porous mass which is more densely compressed in some areas than in other areas.

40. A method as claimed in claim 39 wherein the zinc fibers, filaments, threads or strands have a nominal diameter of between 50 and 300 µm and a length of at least 100 times longer than the nominal diameter.

41. A method as claimed in claim 39 wherein the apparatus is a notched wheel which is partially immersed in molten zinc and when rotated forms fibers, filaments, threads or strands which are dislodged from the wheel by an air-jet or brush.

42. A method as claimed in claim 41 wherein the notched wheel has a tapered edge with an angle less than 30 degrees and a tip width between 20 and 200 µm.

43. A method as claimed in claim 41 wherein an air jet is used to dislodge the fibers, filaments, threads or strands and the nozzle of the air jet is located above the wheel and dislodges the fibers, filaments, threads, or strands from the edge of the wheel as it rotates out of the molten bath.

44. A method as claimed in claim 39 wherein the zinc fibers, filaments, threads or strands are compressed into a porous sheet having a uniform density in the interior area of the sheet.

45. A method as claimed in claim 44 wherein the compressed porous sheet is affixed to a backing material.

46. A method as claimed in claim 45 wherein the porous sheet and the backing material are joined with a separator material, a cathode and a protective mesh and then rolled into an anode-cathode assembly for use in a cylindrical form of electrochemical device.

47. A method as claimed in claim 46 wherein the electrochemical device is an alkaline battery.

* * * * *